United States Patent
Mirkovic et al.

(10) Patent No.: US 7,904,297 B2
(45) Date of Patent: Mar. 8, 2011

(54) DIALOGUE MANAGEMENT USING SCRIPTS AND COMBINED CONFIDENCE SCORES

(75) Inventors: Danilo Mirkovic, Palo Alto, CA (US); Lawrence Cavedon, Palo Alto, CA (US); Matthew Purver, Palo Alto, CA (US); Florin Ratiu, Palo Alto, CA (US); Tobias Scheideck, Palo Alto, CA (US); Fuliang Weng, Palo Alto, CA (US); Qi Zhang, Palo Alto, CA (US); Kui Xu, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 802 days.

(21) Appl. No.: 11/298,765

(22) Filed: Dec. 8, 2005

(65) Prior Publication Data

US 2006/0271364 A1 Nov. 30, 2006

Related U.S. Application Data

(63) Continuation-in-part of application No. 11/142,196, filed on May 31, 2005.

(51) Int. Cl.
*G10L 15/00* (2006.01)
*G10L 15/08* (2006.01)
(52) U.S. Cl. ............. 704/257; 704/239; 704/9; 704/275; 704/235
(58) Field of Classification Search ............. 704/239, 704/275, 9, 257
See application file for complete search history.

(56) References Cited

U.S. PATENT DOCUMENTS

| 6,044,347 | A | * | 3/2000 | Abella et al. .................. 704/272 |
| 6,167,368 | A | * | 12/2000 | Wacholder ........................ 704/9 |
| 6,246,981 | B1 | * | 6/2001 | Papineni et al. ............. 704/235 |
| 6,275,788 | B1 | * | 8/2001 | Watanabe et al. .................. 704/1 |
| 6,377,913 | B1 | * | 4/2002 | Coffman et al. .................. 704/8 |

(Continued)

FOREIGN PATENT DOCUMENTS

EP 0 911 808 A1 4/1999

OTHER PUBLICATIONS

Jeffrey C. Reynar, Statistical models for topic segmentation, Proceedings of the 37th annual meeting of the Association for Computational Linguistics on Computational Linguistics, p. 357-364, Jun. 20-26, 1999, College Park, Maryland.*

(Continued)

*Primary Examiner* — Richemond Dorvil
*Assistant Examiner* — Greg A Borsetti
(74) *Attorney, Agent, or Firm* — Dergosits & Noah LLP; Geoffrey T. Staniford

(57) ABSTRACT

Representation-neutral dialogue systems and methods ("RNDS") are described that include multi-application, multi-device spoken-language dialogue systems based on the information-state update approach. The RNDS includes representation-neutral core components of a dialogue system that provide scripted domain-specific extensions to routines such as dialogue move modeling and reference resolution, easy substitution of specific semantic representations and associated routines, and clean interfaces to external components for language-understanding (i.e., speech-recognition and parsing) and language-generation, and to domain-specific knowledge sources. The RNDS also resolves multi-device dialogue by evaluating and selecting among candidate dialogue moves based on features at multiple levels. Multiple sources of information are combined, multiple speech recognition and parsing hypotheses tested, and multiple device and moves considered to choose the highest scoring hypothesis overall. Confirmation and clarification behavior can be governed by the overall score.

18 Claims, 16 Drawing Sheets

U.S. PATENT DOCUMENTS

| | | | |
|---|---|---|---|
| 6,434,524 B1 | 8/2002 | Weber | |
| 6,631,346 B1* | 10/2003 | Karaorman et al. | 704/9 |
| 6,654,720 B1* | 11/2003 | Graham et al. | 704/270 |
| 6,751,591 B1* | 6/2004 | Gorin et al. | 704/257 |
| 6,859,776 B1* | 2/2005 | Cohen et al. | 704/270 |
| 6,885,736 B2* | 4/2005 | Uppaluru | 379/88.17 |
| 7,231,343 B1* | 6/2007 | Treadgold et al. | 704/9 |
| 7,299,187 B2* | 11/2007 | Tahara et al. | 704/275 |
| 7,302,394 B1* | 11/2007 | Baray et al. | 704/257 |
| 7,343,290 B2* | 3/2008 | Breuer | 704/270.1 |
| 7,353,176 B1* | 4/2008 | Baray et al. | 704/275 |
| 7,412,393 B1* | 8/2008 | De Fabbrizio et al. | 704/275 |
| 7,502,730 B2* | 3/2009 | Wang | 704/9 |
| 2001/0041980 A1 | 11/2001 | Howard et al. | |
| 2002/0095286 A1 | 7/2002 | Ross et al. | |
| 2003/0120486 A1* | 6/2003 | Brittan et al. | 704/231 |
| 2003/0216919 A1* | 11/2003 | Roushar | 704/260 |
| 2003/0233223 A1* | 12/2003 | Wang | 704/4 |
| 2004/0083092 A1* | 4/2004 | Valles | 704/9 |
| 2004/0117189 A1* | 6/2004 | Bennett | 704/270.1 |
| 2004/0186704 A1* | 9/2004 | Sun et al. | 704/4 |
| 2005/0050206 A1* | 3/2005 | Ueda et al. | 709/227 |
| 2005/0131677 A1* | 6/2005 | Assadollahi | 704/201 |
| 2006/0004570 A1* | 1/2006 | Ju et al. | 704/243 |
| 2006/0149544 A1* | 7/2006 | Hakkani-Tur et al. | 704/236 |
| 2006/0168335 A1* | 7/2006 | Hodjat et al. | 709/239 |
| 2009/0018829 A1* | 1/2009 | Kuperstein | 704/235 |

OTHER PUBLICATIONS

A. Gruenstein and L. Cavedon, Using an activity model to address issues in task-oriented dialogue interaction over extended periods, AAAI Spring Symposium on Interaction between Humans and Autonomous Systems over Extended Operation, Mar. 2004.*

Cheng, H., Bratt, H., Mishra, R., Shriberg, E., Upson, S., Chen, J., Weng, F., Peters, S., Cavedon, L., and Niekrasz J. A Wizard-of-Oz framework for collecting spoken human computer dialogs. Proc. of ICSLP-2000, Jeju, Korea, 2004.*

Pakucs. "VoiceXML-Based Dynamic Plug and Play Dialogue Management for Mobile Environments" Jun. 2002.*

Ian Lewin, Ralph Becket, Johan Boye, David Carter, Manny Rayner, and Mats Wiren (1999). Language processing for spoken dialogue systems: is shallow parsing enough? Accessing Information in Spoken Audio: Proceedings of ESCA ETRW Workshop, Cambridge, pp. 37-42.*

B. Pakucs, "Towards Dynamic Multi-Domain Dialogue Processing," Proceedings of the Eighth European Conference on Speech Communication and Technology (Euro-speech 2003), Geneva, Switzerland (2003), pp. 741-744.*

Gruenstein. "Conversational Interfaces: A Domain-Independent Architecture for Task-Oriented Dialogues" 2002.*

Danilo Mirkovic, et al., Practical Plug-and Play Dialogue Management, CSLI, Staniford University, 8 pgs., Proc. Annual Meeting of the Pacific Association of Computational Linguistics (PACLING), Tokyo, (2005).

Manny Rayner, et al., Plug and Play Speech Understanding, netdecisions Ltd, 10 pgs., Proceedings of the Second SIGdial Workshop on Disclosure and Dialog—vol. 16, 2001, Aalborg, Denmark, Sep. 1-2, 2001.

Fuliang Weng, et al., A Conversational Dialogue System for Cognitively Overloaded Users, Research and Technology Center, 4 pgs., Interspeech 2004—ICSLP, 8th International Conference on Spoken Language Processing, Jeju Island, Korea, Oct. 4-8, 2004.

* cited by examiner

530

```
Types {
    Playable;
    ...
}
Slots {
    Playable playable-object;
    ...
}
// Task definitions
taskdef<play, "play"> {
    DefinableSlots {
        required Playable playable-object;
        optional ...    // optional arguments (e.g. volume)
    }
    ...
}
```

FIGURE 5

```
User Command:play {
    // inherits from generic Command dialogue move
    Description "play something"
    Input {
        // "play/start X"
        "s( features(mood(imperative)),
            predicate(#play/vb|#start/vb),
            ?arglist(obj:_,?sbj:*))"
        // "I want to play/hear X"
        "s( features(mood(indirect)),
            predicate(#play/vb|#hear/vb),
            ?arglist(obj:_playable-object,?sbj:*))"
        // other templates ...
    }
    Producing {      // Questions
        System WHQuestion:disambiguate
        System WHQuestion:fill:play:_playable-object {
            Output {avs "(e1 / play
                         :question (q1 / what)
                         :agent i)"
            }
        } ...
        CloseOn System Report:play:playing {
            Output {avs "(e1 / play
                         :patient (p1 / [song])
                         :aspect continuous)"
            }
        }
        ...
    }
    ...
}
```

1. #song --> *Simple* system:hasCategory : music:Song
   "What *songs* do you have?"
2. #this/dt --> *MP3Specific* this music:Song
   "What's *this*?"
3. ncomp(#by/in,sbj:FRAME) --> *Frame* music:songHasArtist|music:albumHasArtist
   "Do you have anything *by* X?"
4. s(predicate(#called|#named),arglist(obj(#:WORD))) --> *Simple* system:hasName
   "Do you have a song *called/named* X?"
5. ncomp(#on/in|#in/in|#from/in,sbj:FRAME) --> *Frame* music:hasSongList
   "Play something *from* an album by X"

FIGURE 8

```
User Command:play {    // inherits from generic Command dialogue move
   Description "play something"
   Input {    /       // templates for matching parser output
      // full parse match: ''play/start X''
      1.0    SYN{ s( features(mood(imperative)), predicate(#play/vb|#start/vb),
                ?arglist(obj:_playable-object,?sbj:*)) }
      // full parse match: ''I want to play/hear X''
      1.0    SYN{ s( features(mood(indirect)), predicate(#play/vb|#hear/vb),
                ?arglist(obj:_playable-object,?sbj:*)) }
      // topic classifier match
      0.1    TOPIC{ play_item }
      // topic classifier match with argument
      0.25   AND{ TOPIC{ play_item },   SYN{ arglist(obj:_playable-object,*) } }
   ... }
   Producing {       // templates for system output: questions
      System WHQuestion:disambiguate
      System WHQuestion:fill:play:_playable-object {
         Output {avs (e1 / play :question (q1 / what) :agent I)
         }
   ... }             // templates for system output: reports
      CloseOn System Report:play:playing {
         Output {avs (e1 / play :patient (p1 / [song]) :aspect continuous)
         }
   ... }
... }
```

FIGURE 11

```
foreach open node O
   foreach n-best list entry N
      foreach matching script entry M
         create candidate move
score all candidates
if (score(top) >> score(second))
then
   select top candidate
else
   generate question to disambiguate
if (score(selected-node) < threshold)
   generate question to confirm
```

FIGURE 12

| Recognition features: | recognition and parse probabilities;<br>recognition and parse n-best ranks; |
|---|---|
| Semantic features: | topic classification for the parse (with score);<br>for dialogue moves spawning activities:<br>    - number of slots filled by input pattern;<br>    - *number of resolved/unresolved slots after NP resolution;*<br>    - *number of ambiguously resolved slots after NP resolution;*<br>for queries about database objects:<br>    - set of constraints sent to the knowledge base;<br>    - *cardinality of the set of knowledge base query results;* |
| Contextual features: | current most active node;<br>current activity;<br>position and recency of the parent node in the active node list;<br>*bi-gram frequencies of the dialogue moves:*<br>    - *DMT attachments - pairs of child and parent node types;*<br>    - *pairs of chronologically consecutive user nodes.* |

FIGURE 13

| NUMBER | CLASS |
|---|---|
| 1 | statement |
| 2 | command/request |
| 3 | reformation/correction |
| 4 | acknowledgement |
| 5 | whquery |
| 6 | ynquery |
| 7 | whanswer |
| 8 | ynanswer |
| 9 | confirmation |
| 10 | acceptance |
| 11 | partialacceptance |
| 12 | rejection |

FIGURE 17

DIALOGUE MANAGEMENT USING SCRIPTS AND COMBINED CONFIDENCE SCORES

CROSS-REFERENCE TO RELATED APPLICATIONS

The current application is a Continuation-in-Part of U.S. application Ser. No. 11/142,196, entitled "Dialogue Management Using Scripts," filed on May 31, 2005 and assigned to the assignees of the present application.

FIELD

The disclosure herein relates generally to dialogue management and, more particularly, to management of multi-application, multi-device spoken-language dialogue systems.

BACKGROUND

Dialog includes language of a conversation between participants as well as a shared central context constructed by the participants to a conversation (e.g., references later in a conversation to "it" refer to something described earlier in the conversation). The participants of the conversation may be human, machine, or any combination of humans and machines. Dialog Management includes interpretation of speaker utterances with respect to the shared context, as well as techniques and strategies for managing the interaction between the dialog participants. Activity-oriented dialogue systems have been in development for applications such as multimodal control of robotic devices, speech-enabled tutoring systems, and conversational interaction with in-car devices. The typical dialogue system architecture includes various components like speech-recognizers, language parsers, language generators, speech-synthesizers, and Dialogue Managers ("DM"). This dialogue system can also include connections to external application-specific components such as ontologies or knowledge bases ("KB"), as well as dialogue-enabled devices. See the following for examples of Dialog Systems: (i) Lemon, O., A. Gruenstein, S. Peters (2002), "Collaborative activities and multi-tasking in dialogue systems", Traitement Automatique des Langues (TAL), 43(2); (ii) Clark, B., J. Fry, M. Ginzton, S. Peters, H. Pon-Barry, Z. Thomsen-Grey (2001), "Automated tutoring dialogues for training in shipboard damage control", SIGdial; and (iii) Weng, F., L. Cavedon, B. Raghunathan, D. Mirkovic, H. Cheng, H. Schmidt, H, Bratt, R. Mishra, S. Peters, L. Zhao, S. Upson, L. Shriberg, C. Bergmann (2004), "A conversational dialogue system for cognitively overloaded users (poster)", INTERSPEECH.

The DM of a dialogue system is an oversight module that facilitates the interaction between dialogue participants. The dialogue system using Activity Models is specific to a type of dialogue, referred to as "activity-oriented dialogue", which is dialogue about activities being (jointly) carried out by a user and a machine, computer, and/or robot. In a user- or speaker-initiated system, the DM directs the processing of an input utterance from one component to another through interpretation and back-end system response. In the process, the DM detects and handles information inputs of an input utterance, and generates system output, for example. The DM may be used with different parsers and language-generation components. Interaction with external devices is mediated by Activity Models ("AMs"), i.e. declarative specifications of device capabilities and their relationships to linguistic processes. However, customization to new domains has generally required some significant programming effort, due to variations in dialogue move requirements across applications, representation variation in interface to the language parser and other components, as well as certain processes (e.g. reference resolution) having domain-specific aspects to them.

The conventional dialogue management systems range from the commercially widely-used yet more constrained dialogue-modeling mechanisms based on voice extensible markup language ("VXML"), to semantic models based on the TrindiKit approach to information-state update. While many dialogue systems are designed and implemented for specific domains, these systems require significant engineering to apply to new domains. Conversely, a dialogue management infrastructure based on VXML allows flexible implementation of speech-based dialogue systems for new domains, but provides only shallow solutions to many issues in dialogue modeling.

Present conventional dialogue management systems also provide limited capabilities for processing confidence scores generated by a speech recognizer unit and/or other sources within the dialogue system. In a multi-device system, determining which device an utterance is directed at is not always straightforward. Although one can use the resolution of noun-phrase (NP) arguments as disambiguating information, the NP-resolution process itself is often device-specific, thus preventing NP's from being properly resolved until the appropriate device has been determined.

INCORPORATION BY REFERENCE

Each publication and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

Embodiments are illustrated by way of example and not limitation in the figures of the accompanying drawings, in which like references indicate similar elements and in which:

FIG. 5 is a portion of a sample Activity Model ("AM") for an MP3 device, under an embodiment.

FIG. 6 is a sample DMS for a "play" Command for an MP3 device, under an embodiment.

FIG. 8 is an example of noun phrase-resolution rules, under an embodiment.

FIG. 11 illustrates an example of a dialogue move script for constructing instantiations of a candidate dialogue move for a device of a plurality of devices, according to an embodiment.

FIG. 12 is a program code excerpt illustrating an algorithm executed by an RNDS DM to instantiate and select a dialogue move, under an embodiment.

FIG. 13 is a table that lists the features used for the scoring function, according to an embodiment.

FIG. 17 is a table that lists the possible classes for the DM classifier, under an embodiment.

Figure 1:
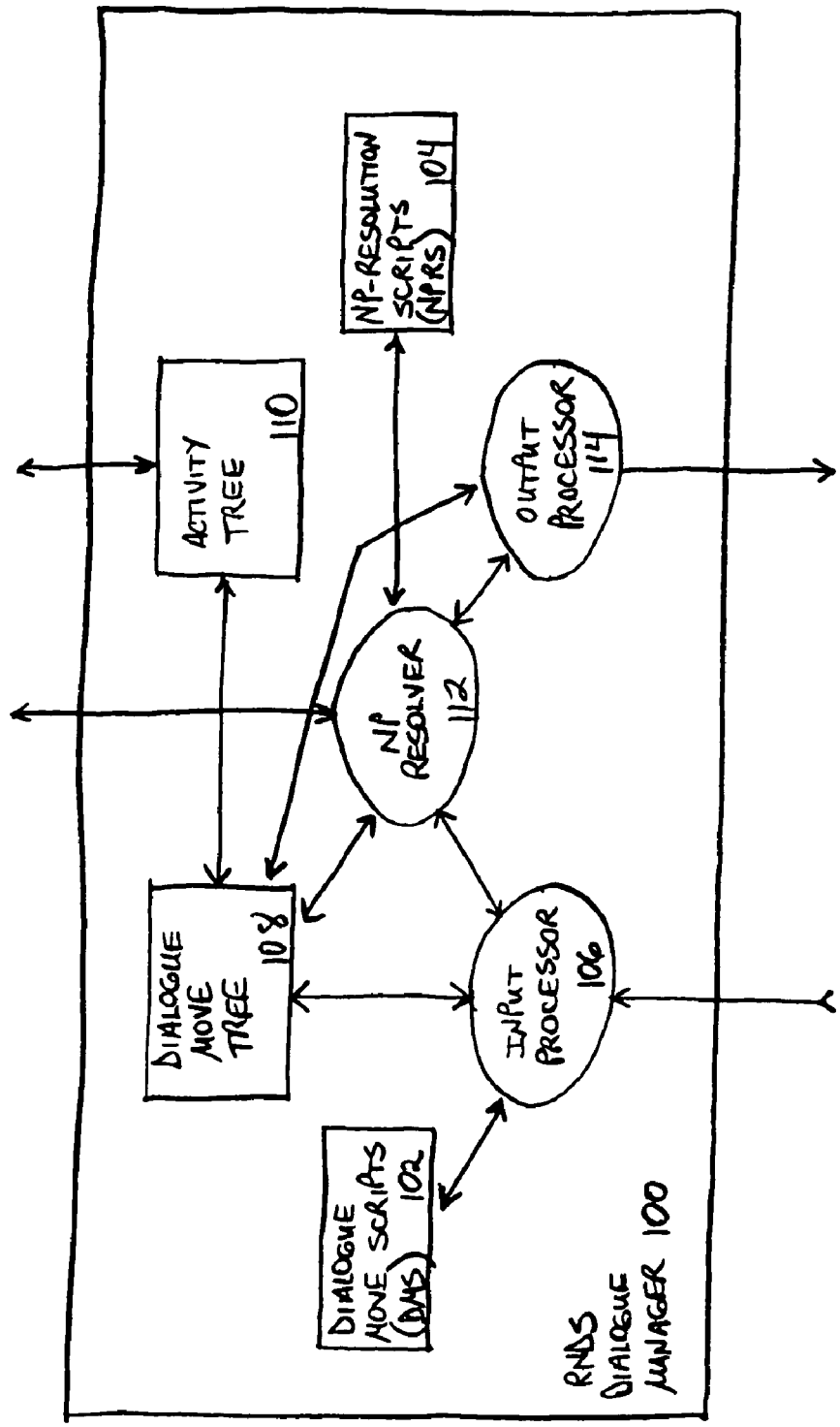
FIG. 1 is a block diagram of a representation-neutral dialogue system ("RNDS") Dialogue Manager ("DM") ("RNDS DM"), under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 100 is first introduced and discussed with respect to FIG. 1).

DETAILED DESCRIPTION

Representation-neutral dialogue systems and methods are described that include multi-application, multi-device spoken-language dialogue systems based on the information-state update approach. The representation-neutral dialogue systems and methods, collectively referred to herein as the Representation-Neutral Dialogue Systems ("RNDS"), include representation-neutral core components of a dialogue system that provide scripted domain-specific extensions to routines such as dialogue move modeling and reference resolution. The RNDS supports substitution of specific semantic representations and associated routines, and clean interfaces to external components for language-understanding (i.e., speech-recognition and parsing) and language-generation, and to domain-specific knowledge sources, thereby reducing or eliminating any requirement to recode any core software components. The RNDS also allows seamless interaction with a community of devices as described below.

Scripts of the RNDS, which include Dialogue Move Scripts ("DMS"), Activity Models, and Noun Phrase Resolution Scripts ("NPRS"), provide the capability for easy customization of the RNDS to new dialogue domains and applications. Further, the RNDS forms the basis of a "plug-and-play" dialogue management architecture in which device application programming interfaces ("APIs") encapsulate customized dialogue moves, activity models, and knowledge bases, as well as domain-specific extensions to core processes (such as reference resolution). This plug-and-play dialogue management enables multi-device dialogue management, allowing new dialogue-enabled devices to be dynamically added to an existing multi-device dialogue system.

The RNDS of an embodiment implements the information-state update approach to dialogue management through the use of the DMS. The DMS includes a combination of generic dialogue processes with an ability to easily extend or customize "dialogue moves", which handle dialogue contributions from the user, to a new domain. In particular, this forms the basis of multi-device dialogue management in the RNDS, where each device provides its own DMS ("device-specific DMS"), which include mappings from user utterances to device-specific dialogue moves. Other scripts of an embodiment (e.g., NPRS) allow customization of other dialogue processes, such as noun phrase-resolution ("NP-resolution") (i.e., mapping object-descriptions in natural language to actual objects in a database), as well as Activity Models, which provide descriptions of capabilities of the dialogue-enabled devices controlled by the dialogue system.

The RNDS scripts are combined with other information from the core dialogue management architecture (e.g., Activity Models ("AM")) to provide a plug-and-play capability in the RNDS. The plug-and-play RNDS of an embodiment allows new devices to be dialogue-enabled and registered dynamically with the DM without requiring the DM to be restarted or re-compiled. In the context of the automobile industry, for example, this allows new devices for the automobile to be sold as dialogue-enabled entities, with the new devices then be added into an existing dialogue system in a vehicle like a car or truck.

The RNDS of an embodiment also supports multi-device dialogue management by extending the existing dialogue-management infrastructure in DMs. The extended dialogue management under the RNDS extends the pertinent data structures so as to simultaneously manage multiple dialogue-enabled devices. The extended dialogue management also extends internal processes, such as NP-resolution, in a way that makes the extended processes appropriate to multi-device interaction. In particular, such processes may be dependent on the selected device, while the device-recognition itself uses NP-resolution.

The multi-device dialogue extension evaluates and selects amongst candidate dialogue moves based on features at multiple levels. Multiple sources of information can be combined, multiple speech recognition and parsing hypotheses tested, and multiple devices and moves considered to choose the highest scoring hypothesis overall. The approach has the added benefit of potentially re-ordering n-best lists of inputs, effectively correcting errors in speech recognition or parsing.

The RNDS therefore provides a combination of powerful practical core dialogue management processes with easy scriptable definitions of domain-specific information, such as dialogue-moves and NP-resolution mappings. The RNDS thus allows easy customization of the DM to new domains and applications, and also provides the means for plug-and-play multi-device dialogue management. The RNDS also provides explicit multi-device dialogue management processes, extending the core dialogue management infrastructure for information-state update dialogue management so as to manage simultaneous interaction with multiple devices.

Of practical importance in the context of automobile applications, conversational dialogue with a vehicle requires interaction with many devices, and natural interaction requires seamless dialogue management with the different devices. Furthermore, as speech-based dialogue interaction with in-car devices becomes a reality, new devices, or devices with upgraded capabilities, are likely to come to market and be dialogue-enabled. The availability of these new or upgraded devices should not require owners of vehicles with built-in DMs to upgrade their systems. Consequently, the dynamic plug-and-play multi-device dialogue management of the RNDS is an essential component to realizing the addition of new dialogue-enabled devices, or enhancements to existing dialogue capabilities of devices within the conventional dialogue management infrastructure.

In the following description, numerous specific details are introduced to provide a thorough understanding of, and enabling description for, embodiments of the RNDS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of a representation-neutral dialogue system ("RNDS") Dialogue Manager ("DM") ("RNDS DM") 100, under an embodiment. The RNDS DM 100 comprises a number of systems or components and device-specific inputs, including but not limited to at least one of Dialogue Move Scripts ("DMS") 102, Noun Phrase-Resolution Scripts ("NPRS") 104, Activity Models, input processor 106, Dialogue Move Tree ("DMT") 108, Activity Tree ("AT") 110, noun phrase-resolver ("NP-resolver") 112, and output processor 114. The components 102-114 of the RNDS DM may be coupled in one or more combinations as appropriate to the embodiment of the system hosting the RNDS DM.

The RNDS DM 100 of the example embodiment includes an input processor 106 that receives inputs from one or more systems external to the RNDS DM. The input processor 106 is coupled to the DMS 102, DMT 108, and the NP-resolver 112. The NPRS 104 is coupled to the NP-resolver 112 but is not so limited. The DMT 108 of an embodiment is coupled to the AT 110. The NP-resolver 112 is also coupled to the DMT 108 and the output processor 114.

The DMS 102 and NPRS 104 of an embodiment function to recognize input commands to the RNDS DM 100 and to translate the command into a query in order to retrieve the object of the command. Specifically, the DMS 102 recognizes input commands (e.g., "play", or other commands like questions, etc.) along with parameters of the input command (e.g., name, description, etc. of an object, Play "X" for example) and, upon recognizing a received command, rules of the NPRS 104 translate the command or formulate a knowledge base or database query to retrieve the actual object of the command (the object "X" of the command "Play X") from a database (not shown). Translating the command/description into a particular query can be device specific because the same string of words may have two completely different meanings depending on the context of the device. The RNDS DM 100 therefore formulates a query that includes information of the type of object a user has requested (song), along with any specified constraints (e.g., name, artist, etc.).

Figure 2:
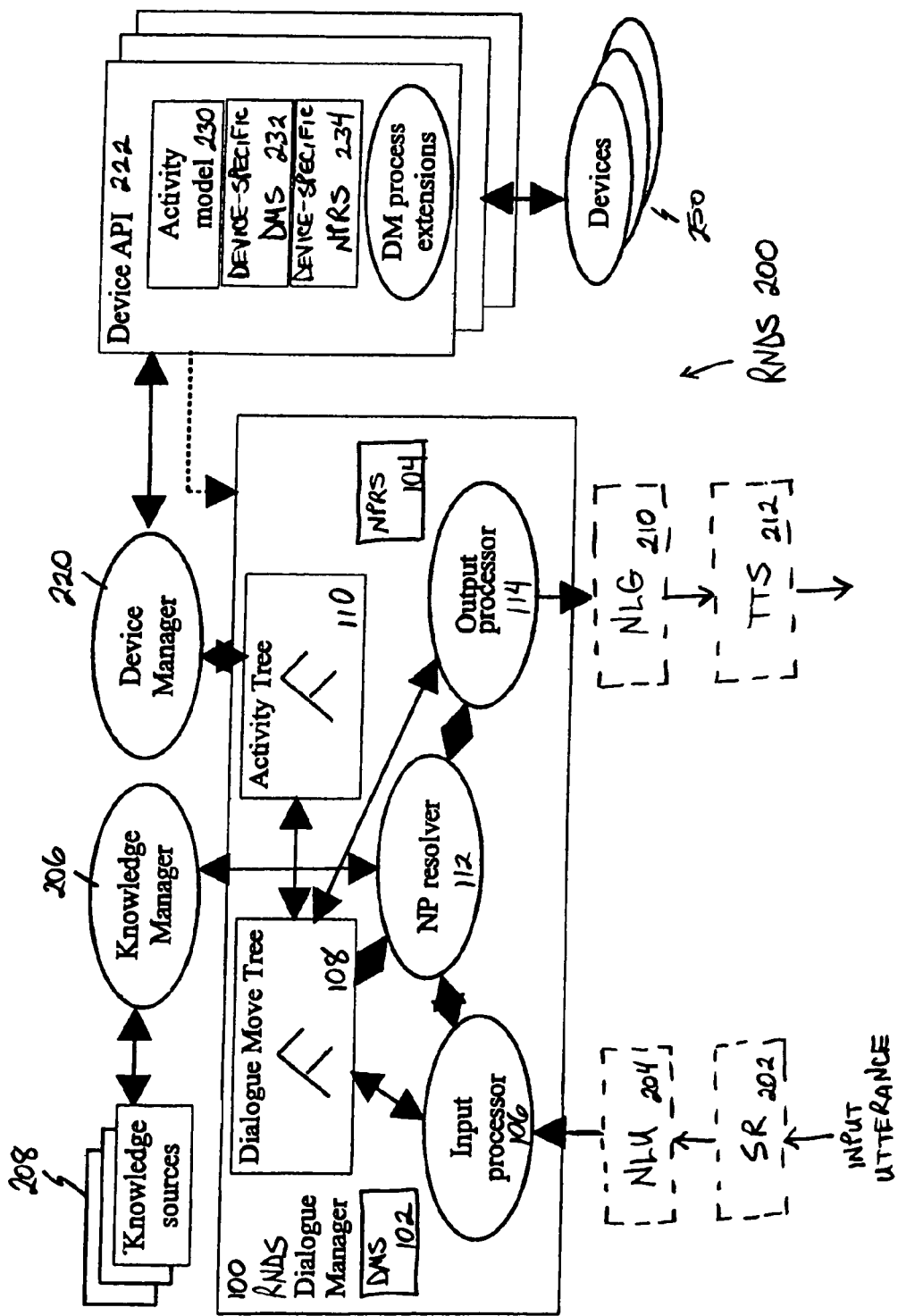
FIG. 2 is a block diagram of an RNDS, under an embodiment.

As an example of a dialogue system that includes the RNDS DM 100, FIG. 2 is a block diagram of a representation-neutral dialogue system ("RNDS") 200, under an embodiment. The RNDS 200 includes a RNDS DM 100 coupled to one or more other components as appropriate to a configuration of the RNDS 200 and/or a system hosting or including the RNDS 200. The RNDS DM 100 includes the DMS 102 and NPRS 104 as described above with reference to FIG. 1 and elsewhere herein. In addition to the RNDS DM 100, the RNDS 200 of an embodiment includes one or more of a speech recognition ("SR") module or system 202, a language understanding module 204, a knowledge management module 206, knowledge sources 208, a language generation ("LG") module 210, and a text-to-speech ("TTS") module 212. The SR module 202 and TTS module 212 are included only in spoken dialog systems. The RNDS 200 may also include an application manager (not shown).

The SR module 202 receives acoustic signals at one or more inputs and outputs a sequence or a lattice of words with additional labels, such as confidence scores. The acoustic signals may come from a user (speaker) (e.g., user utterance). The language understanding module 204, also referred to as a natural language understanding ("NLU") module 204, is coupled to the SR module 202 and receives from the SR module 202 a sequence or a lattice of words with attached confidence at one or more inputs. The NLU module 204 outputs a structured meaning representation that may be based on statistical models trained on in-domain linguistic data and the available knowledge base. The RNDS DM 100 is coupled to the NLU module 204 and receives the structured meaning representations at one or more inputs. The RNDS DM 100 interprets the input representations in context, issuing appropriate instructions to other modules of the RNDS 200 based on the context and its knowledge base.

The knowledge management module 206, or "knowledge manager" ("KM") 206 as it is referred to herein, is coupled to the RNDS DM 100 and serves as a gateway to different knowledge sources or knowledge bases by managing the general ontology, the domain-specific ontology, and the database for any active domain. The RNDS DM 100 also updates and synchronizes the current knowledge base among different modules.

The LG module 210, also referred to as a natural language generator ("NLG") 210 is coupled to the output processor 114 of the RNDS DM 100, for example, and receives at one or more inputs the output from the RNDS DM 100. The LG module 210 organizes the received content in a succinct and grammatical way as appropriate to the TTS module 212. The TTS module 212 receives the organized content from the LG module 210 (e.g., word sequence with tagged features) and produces speech waveforms.

Components of the RNDS DM 100 also couple to one or more Devices 250 using a Device Manager 220 and one or more respective Device APIs 222. The Device Manager 220 of an embodiment couples the AT 110 of the RNDS DM 100 to the Device APIs 222 as appropriate to the number of Devices 250 of the RNDS 200 configuration. Each Device API 222 includes an AM 230, device-specific DMS 232, device-specific NPRS 234 (also referred to as NP-resolution grammar), and dialogue manager process extensions ("DM process extensions"), but is not so limited.

The DMS 102 and NPRS 104 of the RNDS DM 100 therefore enhance extensibility, customization, and reuse of the RNDS DM 100, as well as provide the basis of the multi-device plug-and-play RNDS 200. The DMS 102 and NPRS 104 allow the RNDS 200 to be customizable via scripting to new domains and applications. The scripting also allows for encapsulation of device information in support of the plug-and-play capability of the RNDS 200. Consequently, the RNDS DM 100 and RNDS 200 provide a framework in which new devices, or dialogue-capability for existing devices, can easily be added to a host system without disruption to an existing infrastructure. As one example, embodiments of the RNDS DM 100 and RNDS 200 may be components of a system for dialogue control of in-car electronic components, such as entertainment systems, navigation systems, and telematic devices, but the embodiments are not limited to vehicle systems.

Figure 3:
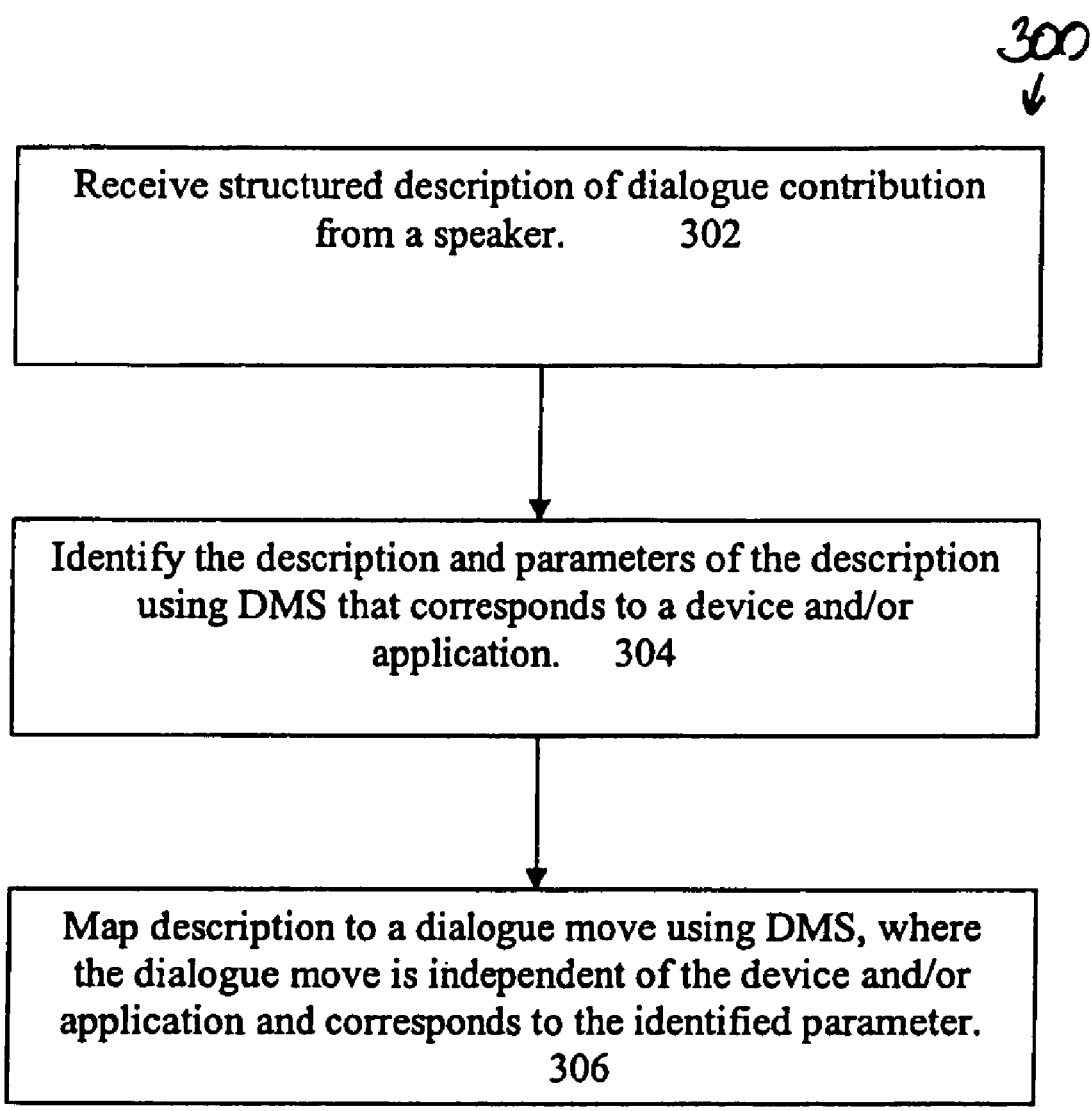
FIG. 3 is a flow diagram for mapping a description of a dialogue contribution to a dialogue move using a Dialogue Move Script ("DMS"), under an embodiment.

As one example involving operations of the DMS 102, FIG. 3 is a flow diagram for mapping 300 a description of a dialogue contribution to a dialogue move using a DMS, under an embodiment. The mapping 300 begins, following receipt of an acoustic signal from a speaker, with the receipt 302 of a structured description of a dialogue contribution from the speaker. This structure description may include one or more of syntactic, semantic, and phonological information, as well as utterance-wide information such as topic classification. A DMS is selected for use in identifying 304 the description and at least one parameter of the description. The DMS corresponds to at least one of a device and an application, but is not so limited. The DMS maps 306 the description to a dialogue move, where the dialogue move is independent of the device and application and corresponds to the recognized parameter.

The dialogue moves are customizable or adaptable for use across numerous domains and/or applications via reprogramming of the DMS.

Figure 4:
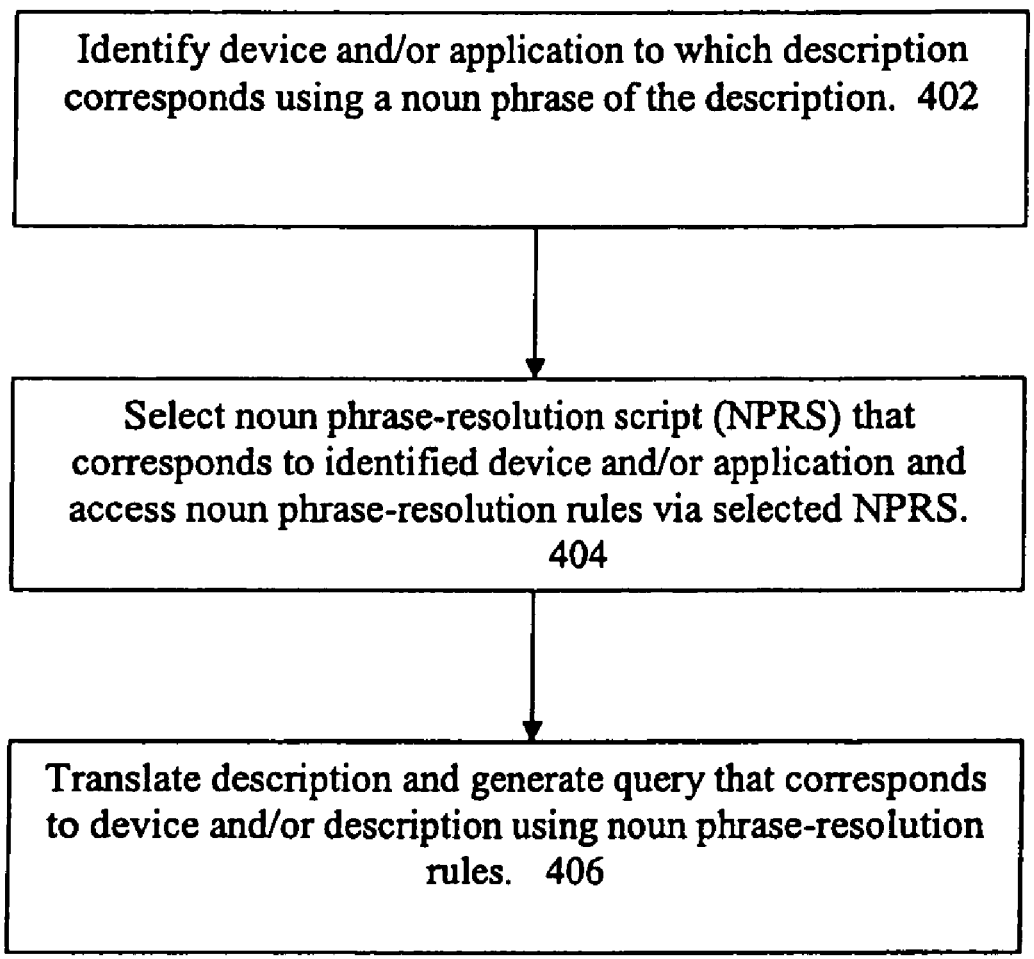
FIG. 4 is a flow diagram for using a noun phrase-resolution script ("NPRS") to generate a database query (noun phrase-query) that corresponds to a device, under an embodiment.

Turning to an example involving operations of the NPRS 104, FIG. 4 is a flow diagram for using an NPRS to generate a database query (noun phrase-query) that corresponds to a device, under an embodiment. Generation of the query begins by identifying 402 the device and/or application to which the description of a dialogue contribution from a speaker corresponds. The identification 402 uses a noun phrase of the description but is not so limited. A noun phrase-resolution script (NPRS) is selected 404 that corresponds to the identified device and/or application, and the NPRS is used to access noun phrase-resolution rules. The noun phrase resolution rules are used to translate 406 the description and generate a query that corresponds to the device and/or the description. The query once generated is provided to a database or knowledge base of the RNDS in order to retrieve an object (or multiple objects) corresponding to the dialogue contribution from the database.

Components of the RNDS DM 100 and/or the RNDS 200 may couple to other components not shown in the figures herein. While the term "components" and/or "modules" is generally used herein, it is understood that "components" and "modules" include circuitry, components, modules, and/or any combination of circuitry, components, and/or modules as the terms are known in the art. While various components shown herein may be depicted as co-located, the embodiment is not to be so limited; the RNDS DM 100 and/or RNDS 200 of various alternative embodiments may distribute one or more functions provided by any described component among any number and/or type of components, modules, and/or circuitry.

While one of each of the components comprising the RNDS DM 100 and/or RNDS 200 are shown, various alternative embodiments include any number and/or combination of each of these components coupled in various configurations known in the art. Further, while the components of the RNDS DM 100 and/or RNDS 200 are shown as separate blocks, some or all of these blocks can be monolithically integrated onto a single chip, distributed among a number of chips or components of a host system, and/or provided by some combination of algorithms. The term "processor" as generally used herein refers to any logic processing unit, such as one or more CPUs, digital signal processors ("DSP"), application-specific integrated circuits ("ASIC"), etc.

The actual configuration of the RNDS DM 100 and/or the RNDS 200 is as appropriate to the components, configuration, functionality, and/or form-factor of a host system; the couplings shown between components of the RNDS DM 100 and/or the RNDS 200 therefore are representative only and are not to limit the RNDS DM 100 and/or the RNDS 200 to the configuration shown. The RNDS DM 100 and/or the RNDS 200 can be implemented in any combination of software algorithm(s), firmware, and hardware running on one or more processors, where the software can be stored on any suitable computer-readable medium, such as microcode stored in a semiconductor chip, on a computer-readable disk, or downloaded from a server and stored locally at the host device for example.

The RNDS DM 100 and/or the RNDS 200 may couple among any combination of other components under program or algorithmic control, these other components including processors, memory devices, buses, controllers, input/output devices, communication systems, and displays to name a few. A coupled database may include any number, type, and/or combination of memory devices, including read-only memory ("ROM") and random access memory ("RAM"), but is not so limited.

The DMS 102 of the RNDS DM 100 facilitates use of the same Java code components across different devices (devices coupled to the inputs and outputs of the RNDS DM 100) because it allows different devices to use the Java components of the RNDS DM 100 according to the requirements of the particular device. Consequently, the DMS 102 is analogous to a programming language for writing dialog moves. The DMS 102 provides a way of efficiently adapting dialog moves for use across different domains or applications by adapting the Java code of a dialog move at a level higher than the actual Java code in order to use the dialog move across numerous devices. Therefore, any changes required to the RNDS DM 100 in order to process inputs from or outputs to particular devices can be accommodated via changes at the DMS 102 without requiring changes to the Java code of the core dialog moves. The DMS 102 thus allows dialog moves to be used in a new application or to command a new device without changes to the core Java code of the dialog move. The DMS 102 similarly allows for efficient generation of new applications for new devices as well.

The RNDS DM 100, with reference to FIGS. 1 and 2, can be used with different components for parsing, NL generation (NLG), etc. Embodiments of the RNDS DM 100 may use a rule-based head-driven parser (e.g., Gemini NLU system) with grammars tailored to the particular application domain, where the parser itself performs semantic normalization, returning semantic "logical forms" directly corresponding to the specific representations of device activities. Embodiments of the RNDS DM 100 may also use a third-party statistical parser, returning only weakly normalized semantic forms.

The RNDS DM 100 of an embodiment uses the information-state model or update approach (see Larsson, S. and D. Traum, 2000, "Information state and dialogue management in the TRINDI dialogue move engine toolkit", Natural Language Engineering, 6(3-4)) to maintain dialogue context. The "information-state model" is a modeling approach that models a context-dependent method of interpreting every contribution by participants to a conversation (objects and other knowledge introduced into the conversation by the participants make up the context). The information-state model builds a context based on things said before so that speakers are not required to express necessarily complete thoughts at a later point in a conversation. The dialogue context is then used to interpret incoming utterances (including fragments and revisions), resolve noun phrases ("NPs"), construct salient responses, track issues, etc. Dialogue state is also used to bias speech-recognizer expectation and improve SR performance (see Lemon, O. and A. Gruenstein, 2004, "Multi-threaded content for robust conversational interfaces: context-sensitive speech-recognition and interpretation of corrective fragments", Transactions on Computer-Human Interaction (ACM TOCHI), 11(3)).

The two central RNDS DM 100 components of the dialogue information state are the DMT 108 and the AT 110. The DMT 108 represents the historical context of a dialogue. Each dialogue contribution is classified as a "dialogue move" (e.g. "Command", "WhQuestion", "WhAnswer", etc.), and is interpreted in context by attaching itself to an appropriate "active" node on the DMT 108. For example, a "WhAnswer" attaches to an active corresponding "WhQuestion" node. The tree structure of the DMT 108 specifically supports multi-threaded, multi-topic conversations, where a new conversation topic spawns a new branch (see Lemon, O., A. Gruenstein, S. Peters (2002). "Collaborative activities and multi-tasking in dialogue systems", Traitement Automatique des Langues (TAL), 43(2)). A dialogue move that cannot attach itself to the most recent active node may attach to an active node in another branch (corresponding to a resumed conversation) or open a new branch by attaching itself to the root node (corresponding to a new conversation thread). The DMT 108 also serves as context for interpreting fragments, multi-utterance constructs, and revisions, and provides discourse structure for tasks such as NP-resolution.

The AT 110 manages activities relevant to a dialogue. When the user issues a command, this generally results in a new "activity" being created and added to the AT 110. Before the activity can actually be sent to the device for execution, the RNDS 200 attempts to fully "resolve" it, e.g. resolving all referring NPs or spawning a sub-dialogue to elicit further information. Revisions and corrections (e.g. "I meant/said . . . ") typically involve editing an existing activity representation. Activity-execution is monitored on the AT 110 and changes may result in a notification message being generated, e.g. on failure or successful completion of a task.

The AT 110 is coupled to AMs 230 of Devices 250 of the RNDS 200 via the Device Manager 220 and Device API 222, as described above. The AM 230, which encapsulates device-specific information, is a declarative specification of the capabilities of the agent or device with which the RNDS DM 100 interfaces, and includes linguistic information, such as mappings from predicate/argument structure to device-actions. Arguments that are marked as "required" may generate sub-dialogues when a user-command is given with missing arguments.

The device-encapsulation approach, and in particular the dialogue move scripting language and NP-resolution rules described here, may be applied to an initial domain, controlling an MP3 music player and accessing a music database, for example. FIG. 5 is a portion of a sample Activity Model ("AM") 530 for an MP3 device, under an embodiment. The "required" argument position of this AM 530 includes "Playable", which corresponds to a class from the associated ontology of objects associated with this application; "playable-object" is a variable name filled by matching a dialogue move, as described below.

Dialogue managers may code dialogue moves completely programmatically (e.g. in Java). Dialogue managers also may include libraries of general-purpose dialogue moves (e.g. "Command", "WhQuestion", "WhAnswer", etc) corresponding to the types of dialogue contributions found in activity-oriented dialogues. As the dialogue manager was applied to new applications, new dialogue moves were implemented as appropriate to the applications, or existing dialogue moves refined to apply to the new application. Multiple applications were implemented in this way.

Customizing dialogue moves to new domains therefore typically required substantial coding or recoding. Further, using off-the-shelf parsers with wide-coverage grammars, or corpus-trained statistical parsers, required the dialogue manager to be able to handle new input semantic forms. The requirement of broad coverage dictated that the mapping from input to correct dialogue move be easily extensible. One approach to extending coverage is to normalize semantic information against broad language ontology (e.g. WordNet (see Miller, G. A., 1995, "WordNet: A lexical database for English", Comm. of the ACM 38)) or other knowledge base (see Dzikovska, M., 2004, "A Practical Semantic Representation for Natural Language Parsing", Ph.D. Thesis, University of Rochester). However, this still requires incoming forms to be mapped to the internal representation.

The dialogue-scripting language for writing the DMS 102 of an embodiment promotes re-use of dialogue moves, enhances extensibility, and copes with semantic variation across domains. The dialogue-scripting language of an embodiment defines hierarchical definitions of dialogue moves, allowing inheritance and re-use of existing dialogue moves, while allowing customization to a particular domain or device. The dialogue-scripting language of an embodiment also defines direct mappings of input semantic forms to appropriate dialogue moves. Further, the dialogue-scripting language provides attachment rules for information update. Additionally, the dialogue-scripting language provides other dialogue move-specific information, such as specification of output to be generated for disambiguation, requests for required information, to name a few.

The use of easily-extensible DMS 102 is consistent with using other approaches to achieve broad semantic coverage, such as use of an ontology or knowledge-base as mentioned above. However, it additionally provides a general approach for supplying application-specific information to the RNDS DM 100, for customizing it to new domains, as well as enabling the plug and play multi-device infrastructure of the RNDS 200 described herein.

FIG. 6 is a sample Dialogue Move Script ("DMS") 602 for a "play" Command for an MP3 device, under an embodiment. Variables in the DMS 602 correspond to variables in the AM for the corresponding device. In particular, the AM for the MP3 device contains a "play" operation with a corresponding (required) "_playable-object" argument. When an incoming semantic form matches an "Input" template in this DMS 602, the unification operation fills the "_playable-object" variable, which resolves to an object from the device's domain of objects (further described below) and fills the corresponding slot in the activity constructed from the device AM. Further details on the properties of the dialogue move scripting language follow. While this sample DMS 602 is for a particular command used with a particular type of device, the embodiments described herein are not limited to this command or this device.

The dialogue move scripting language of an embodiment allows hierarchical specification and refinement of dialogue moves. The sample DMS 602 corresponds to a "play" command, and inherits from a more generic "Command" dialogue move. The "Command" dialogue move is implemented in Java for example, where the corresponding DMS has a field that names the Java class that implements the dialogue move. The "play" command move is implemented by the same generic code, but specifies its own patterns for triggering the move, and defines attachment patterns and appropriate generation messages. In general, the depth of inheritance is unbounded (e.g. a sub-move of the "play" command move may be defined that is applicable in very specific contexts).

One type of move for which the inheritance of the DMS is particularly useful is information-query moves across devices. Questions about music in an MP3 database or restaurants in a city information guide are often structurally similar, i.e. query-construction itself is (relatively) domain-independent. Each type of query can be handled by a different dialogue move (corresponding to different devices or knowledge sources), but each set of "Inputs" can be inherited from a single "Query" dialogue move.

Other operations that can be applied at abstract levels of dialogue move include "rewrite rules" that are used to transform input forms before they are matched against dialogue move "Input" templates, e.g., transforming indirect commands into direct imperatives, or replacing a temporal marker (e.g. "now") with an appropriate semantic feature. Rewrite rules are domain/device-independent and are applied to the input before any specific device or dialogue move is selected.

The DMS of an embodiment also supports selection of dialogue moves via semantic templates. The "Input" section of a DMS includes the list of input items that would trigger this particular dialogue move. These templates are matched against the output of the parser (in the case of the example DMS 602, a statistical parser trained on a corpus collected from Wizard of Oz experiments of users interacting with an MP3 player (see Cheng, H., H. Bratt, R. Mishra, E. Shriberg, S. Upson, J. Chen, F. Weng, S. Peters, L. Cavedon, J. Niekrasz, 2004, "A Wizard of Oz framework for collecting spoken human-computer dialogs", INTERSPEECH: 8$^{th}$ International Conference on Spoken Language Processing, Jeju Island, Korea)). Parsed forms may be normalized or processed in any way (e.g., using an ontology, or via rewrite rules) before being matched against "Input" templates. "Input" templates can be attached to domain-specific dialogue moves or to generic moves (and inherited).

The specific formalism of the "Input" templates in the example DMS 602 illustrates a specific instance matching the output of a specific statistical parser; a different parser output formalism would use a different formalism, but in general, the templates can be viewed as feature structures, and the matching operation is effectively one-way unification. The symbols of an embodiment are interpreted as follows, but may not be so limited: "#" represents a lexical item, with a part-of-speech tag following the "/" symbol; "|" represents alternatives; "?" represents an optional argument; "_" represents a variable matching one from the Activity Model; and "*"represents a match with anything. Hence, the dialogue move in the example DMS 602 matches "play X", "start X", or an indirect command involving "play X" or "hear X" (for convenience, indirect commands have their embedded sentence extracted using a generic rewrite rule); the object to be played is marked as optional (i.e., the template matches even when this argument is missing).

The RNDS DM 100 is representation neutral in that the form of the templates and the corresponding matching algorithm can be replaced without affecting the RNDS DM infrastructure. This enables easy replacement of the parser or NLG component to ones using different representations. For example, a more standard feature-structure representation and feature-unification algorithm could be substituted with no other changes required to the RNDS DM code.

When an input form matches an entry in a dialogue move's "Input" section, this may cause variables to be bound; in particular, a variable may be bound that corresponds to one from the AM. For example, if an input matching the example DMS 602 includes a well-formed "arg" argument, then this supplies a value for "_playable-object"; if no "arg" is present, then this variable is left unfilled (in which case the "Command" dialogue move may generate a request for information).

In general, multiple matches are possible, since there are generally multiple scripted dialogue moves and multiple entries in each move's "Input" section. The RNDS DM 100 of an embodiment scores each possible match using generic criteria (e.g. applicability to current context; minimizing unresolved information). However, alternative embodiments may include probabilistic approaches to incorporating evidence from multiple criteria to select appropriate dialogue moves, including prosodic information and shallow topic-categorization.

The dialogue scripting language of an embodiment provides a mechanism for specifying attachment rules. These attachment rules determine the types of dialogue moves that can attach to existing active nodes in the DMT. For example, the example DMS 602 shows that (among others) a disambiguating "WhQuestion" or a "WhQuestion" for filling a missing argument can attach to a "Command" node (such attachment rules are often specified at more abstract levels, not at the level of specific commands). Dialogue move information can be scripted "in place" inside one of these specifications (as done for the "WhQuestion:fill:play" move).

The DMS also encodes which adjacent moves close a dialogue move (i.e. inactivate it so no other move can attach to it), in the "CloseOn" field. Closing a node for attachment effectively closes the corresponding thread of conversation (revisions may reopen a "Command" or "Query" node). Nodes are also automatically closed after a specified period.

Much of the RNDS output is automatically generated, e.g. encoded in general-purpose dialogue moves. However, applications may call for domain- and device-specific outputs. These domain- and device-specific outputs can also be encoded in the DMS 102 of an embodiment; since these outputs will be system responses, these are encoded inside "System" dialogue moves. The DMS 102 permits any representation of these specific outputs, so long as the representation matches the representation used by the specific NLG system 210 with which the RNDS DM 100 interfaces for the given application. In this manner the RNDS DM 100 is representation-neutral because use of a different NLG component (using a different representation) in the dialogue system results only in modification of the DMS 102, and requires no modification to the core of the RNDS DM 100.

The RNDS 200 therefore provides a combination of powerful practical core dialogue management processes with easy scriptable definitions of domain-specific information, such as dialogue-moves and NP-resolution mappings. The RNDS 200 is thus customizable to new domains and applications, and also provides the means for plug-and-play multi-device dialogue management as described above. This plug-and-play capability is an important feature of systems that can have their functionality extended without going off-line. Plug-and-play typically involves adding new components that provide enhanced functionality to the RNDS 200 without disrupting the existing framework. The RNDS 200 of an embodiment implements the plug-and-play environment through the use of a specification language by which components advertise their capabilities, as well as encapsulation of the implementation of the component.

The plug-and-play multi-device dialogue management supports the addition of new devices to the RNDS 200 that function with the RNDS DM 100 without having to load new software or otherwise modify the RNDS DM 100. The new device, when plugged in to the RNDS 200, broadcasts information of its interface to the RNDS DM 100. For example, the new device may provide the RNDS DM 100 with information of the functions it performs (activity model), the language(s) it handles (types of things device understands from user), any device-specific DMS 232, any device-specific NPRS 234 (if descriptions of objects pertinent to the device are present in the system then the device tells the RNDS DM 100 how to translate the objects into queries for the device's KB), and device-specific core Java code.

Referring to FIG. 2, new devices that register with the RNDS DM 100 encapsulate all information required for use by the RNDS DM 100 in managing dialogue with these new devices. This encapsulated information includes four components in an embodiment, where the four components include the DMS 232, as described above, the AM 230 describing any device functionality accessible by the dialogue, device-specific ontology and/or knowledge base, and rules for device-specific NP-resolution 234. The encapsulated information of alternative embodiments may include additional or different information as appropriate to the device and the RNDS DM 100.

Device-specific implementations of dialogue management processes can also be added, or used to overwrite generic implementations, by including new Java classes in the encapsulated information as appropriate to the device. For example, a dialogue-move that handles a new form of interaction introduced by a new device could be added. In general, however, the four components that make up the encapsulated information include all device-specific information used by the RNDS DM 100 for dialogue with the device, and allow for dynamic plug-and-play of dialogue-enabled devices.

In providing multi-device dialogue management, the RNDS DM 100 of an embodiment extends the DMT infrastructure so as to allow new devices to be dynamically added or plugged in to the RNDS 200. Once added, the new dialogue-enabled devices register themselves with the RNDS DM 100, and nodes in the DMT 108 are associated with specific devices where appropriate. Also, "current device" becomes part of the information-state and interpreting incoming utterances is performed in this context.

The RNDS DM 100 also performs device selection (i.e., determining with which device an utterance is associated) as a component process of multi-device dialogue management. The device selection decision process of the RNDS DM 100 involves lexical and semantic information, dialogue move classification, and discourse structure, as well as bias towards the "current device". The decision process also uses a strategy that relates NPs to the appropriate device ontology (e.g. reference to a "song" will match a category in the ontology associated with an MP3 device, but potentially with no other devices). This strategy however does not necessarily resolve all device-ambiguities; for example an address-book may be used by both a phone-device ("get John on the phone") as well as a navigation service ("how do I get to John's house?").

Consequently, the RNDS DM 100 relates the processes of device-selection and NP-resolution as co-dependent processes because information about the resolution of NPs provides important clues about the device being referred to, but NP-resolution may actually be quite device-specific, as described below. The RNDS DM 100 thus performs a shallow NP analysis (e.g. matching nouns and proper names against ontology categories and KB items associated with a specific device) in order to identify a device, and then uses the device-specific NP-resolution rules described below to fully resolve the NPs. Alternative embodiments however may use other features (e.g., shallow topic-categorization techniques) and/or probabilistic methods for this classification task.

Much of the NP-resolution process can be seen as fairly domain-independent (e.g. anaphora resolution). However, aspects of NP-resolution are both domain- and device-dependent. For example, the phrase "What's this" is interpreted differently in the context of music playing over an MP3 player than when using a touch-screen multimodal interface. The RNDS DM 100 addresses this in a manner analogous to the DMS 102 for customizing dialogue moves by custom-adapting the core NP-resolution capabilities implemented in the RNDS DM 100 for a specific domain/device via the NP-resolution scripting language and the NPRS 104. The NPRS 104 is effectively context-free grammars that allow the user to define how NP objects are mapped to knowledge-base queries for a specific device, in the context of the current dialogue information state and input semantic form. In particular, for the MP3 device, "this" in the context of "What's this" would be mapped to a query that returns the name of the currently playing song for example.

Figure 7:
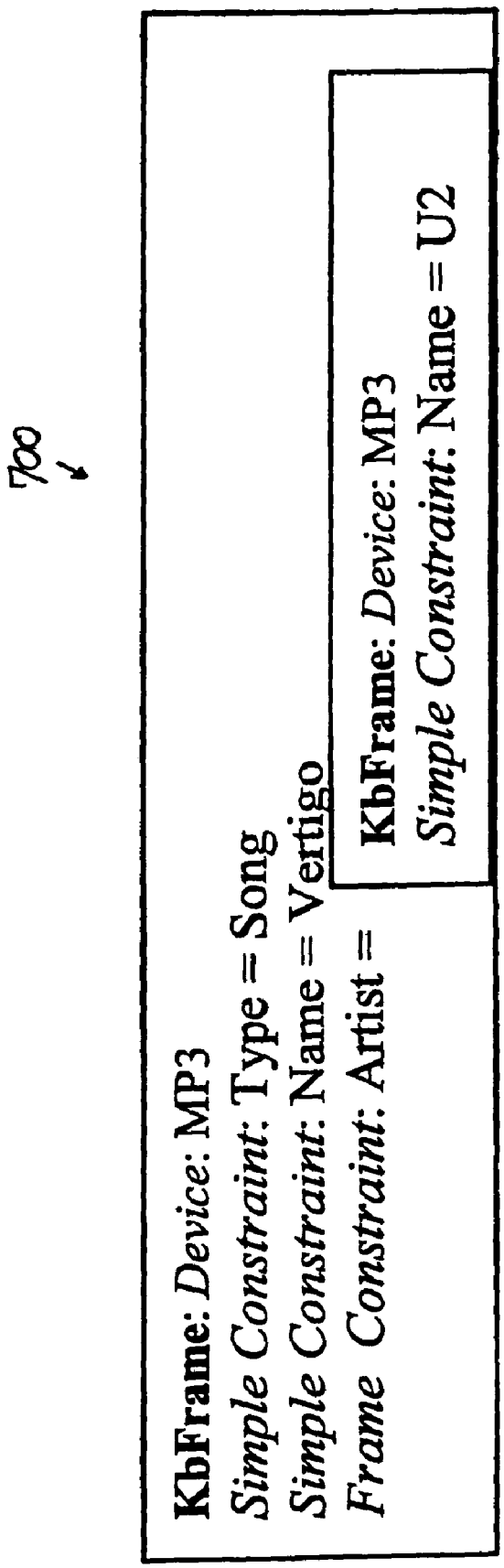
FIG. 7 is a sample noun phrase-query ("NP-query") object for "the song Vertigo by U2", under an embodiment.

The RNDS DM 100 uses the NPRSs 104 to translate NPs into Java objects implementing constraint-based KB-queries (referred to herein as a "noun phrase-query" or "NP-query"). FIG. 7 is a sample noun phrase-query ("NP-query") object 700 for "the song Vertigo by U2", under an embodiment. Rules of the RNDS DM 100 specify how to translate NPs specified in the input semantic form into such objects. The RNDS DM 100 includes a number of generic constraint objects and associated transformations, but further objects may be included as part of the device encapsulation to provide any novel processing specific to that device. For example, an MP3 device will need to handle qualifiers such as "by artist", and know to translate this construct into an appropriate constraint on the "artist" field of the KB.

The way in which information is extracted from an NP representation depends, of course, on the specific format of the input as well as the structure of the KB associated with a device. The RNDS DM 100 uses a rule-based language for specifying how an NP (regardless of format) maps to constraint-based query objects, making use of generic or device-specific frame-construction operations. Such rules are used for handling synonyms (i.e. by mapping multiple nouns into the same query-type) as well as specifying the construction of complex query objects from complex NPs.

FIG. 8 is an example of noun phrase-resolution ("NP-resolution") rules 800, under an embodiment. These NP-resolution rules 800 are taken from the NP-resolution script for an MP3 device, but are not so limited. The left-hand side of each rule matches a construct from the output of the statistical parser used in this particular application: the symbol "#" indicates that the corresponding word has been marked as a head word; the token following "/" is the part-of-speech ("POS") of the matched item; and entries in upper-case designate variables. The right-hand side of each rule specifies how to construct a query or constraint for the KB: the first item signifies what type of constraint this is (which determines which construction process to use); the remaining portion of the right-hand side specifies the specific KB fields to test.

Referring to the NP-resolution rules 800, (1) constructs a simple query for objects of type "Song"; (2) utilizes an MP3-specific constraint-construction processes to match a "Song" labeled as "this" (which is mapped to the currently playing song); (3) maps a "by X" complement onto a constraint on "Artist" (for either a song or an album), where the "FRAME" variable indicates that the embedded NP may be complex and should itself be analyzed; (4) handles an embedded sentence of the form "named X"; and (5) handles other complements that may qualify a query for a song. Rules may be recursive in that the output of one rule application may be the input to another rule.

The NP-resolution rule constructions of an embodiment, while not dependent on the particular syntax or format of the rules, can be easily specified for a given new device and encapsulated with the device. As with the DMS 102, generic constructs can be inherited or overwritten in a device-specific script, while device-specific NP-interpretation rules can be encapsulated with the given device.

The RNDS 200 described herein provides management of multi-device conversations, dialogue-move scripting that facilitates greater portability to new domains and also enables multi-device dialogue, and scripting functionality to extend other core dialogue processes (such as NP-resolution) so as to cover domain-specific phenomena. Data-structures and processes internal to the RNDS 200 are also enhanced to handle switching conversation between different devices. These features are packaged so as to facilitate a programming API that enables dynamic "plug-and-play" of new devices into the RNDS DM 100.

The RNDS of an embodiment includes a method comprising at least one of receiving an input pattern generated from an acoustic signal that includes a description of a dialogue contribution from a speaker, identifying the description and at least one parameter of the description using a dialogue move script (DMS), wherein the DMS corresponds to at least one of a device and an application, and mapping the description to a dialogue move using the DMS, the dialogue move corresponding to the identified parameter and independent of the device and application.

The method of an embodiment further comprises adapting the dialogue move for use across at least one of a plurality of different domains and a plurality of different applications via reprogramming of the DMS.

The method of an embodiment further comprises at least one of identifying at least one of the device and application to which the description corresponds using a noun phrase of the description, selecting a noun phrase-resolution script (NPRS) that corresponds to at least one of the identified device and application and accessing noun phrase-resolution rules via the selected NPRS, and translating the description and generating a query that corresponds to at least one of the device and the description using the noun phrase-resolution rules.

The method of an embodiment further comprises retrieving at least one object referenced by object descriptions from the dialogue contribution from at least one database in response to the query. The object descriptions of an embodiment include noun-phrases.

The method of an embodiment further comprises adapting at least one of the noun phrase-resolution rules for use across at least one of a plurality of different domains and a plurality of different applications via reprogramming of the NPRS.

The NPRS of an embodiment includes KnowledgeBase-query construction rules that are programmable to define how noun phrase objects are mapped to the query for each of a plurality of devices.

Generating the query of an embodiment includes translating a noun phrase of the description into the object.

The description of an embodiment is a structured language-based description that includes at least one of a semantic description, a syntactic description, phonological information, utterance-level information, and topic-classification of the dialogue contribution.

The mapping of an embodiment further comprises recognizing at least one parameter of the dialogue contribution.

The method of an embodiment further comprises scoring matches between variables of the description and the dialogue move components.

The RNDS of an embodiment includes a system comprising at least one of: a dialogue manager based on the information-state-update approach that includes a plurality of dialogue moves and a dialogue move script (DMS) that corresponds to at least one of a device and an application, the dialogue manager receiving an input pattern generated from an acoustic signal that includes a description of a dialogue contribution from a speaker, the DMS recognizing the description and at least one parameter of the description, the DMS mapping the description to a one of the dialogue moves that corresponds to the recognized parameter; a knowledge manager coupled to the dialogue manager and to at least one database; and a device manager coupled to the dialogue manager.

The plurality of dialogue moves of an embodiment is adapted for use across at least one different domain and application via reprogramming of the DMS.

The dialogue manager of an embodiment further comprises a noun phrase resolver coupled to a plurality of noun phrase-resolution scripts (NPRSs) and a plurality of rules, wherein each NPRS corresponds to at least one of the device and the application.

The noun phrase resolver of an embodiment uses the NPRS to access the rules and translate the recognized description in order to generate a query that corresponds to at least one of the device and application.

The rules of an embodiment are adapted for use across at least one different domain and application via reprogramming of the NPRS.

The NPRS of an embodiment includes KnowledgeBase-query construction rules that are programmable to define how noun phrase objects are mapped to the query for each of the devices.

The system of an embodiment further comprises at least one database, wherein the knowledge manager transfers the query to the database. In response to the query the dialogue manager of an embodiment receives at least one object of the dialogue contribution from the database.

The system of an embodiment further comprises a plurality of devices, wherein each device is coupled to the device manager through a description of each device conforming to a device application programming interface (API), wherein each device description includes at least one of an activity model, a device-specific DMS, a device-specific NPRS, and code implementing further device-specific functionality. The code of an embodiment implementing further device-specific functionality includes device-specific dialogue moves. The activity model of an embodiment includes variables that correspond to DMS variables.

In response to coupling of the device to the device manager the dialogue manager of an embodiment receives and stores information of the activity model, device-specific DMS, device-specific NPRS, and device-specific dialogue moves from the device API.

The system of an embodiment further comprises at least one of a speech recognition module and a language understanding module coupled to an input of the dialogue manager.

The system of an embodiment further comprises at least one of a language generation module and a text-to-speech module coupled to an output of the dialogue manager.

The RNDS of an embodiment includes a dialogue-enabling device including at least one of means for receiving an input pattern generated from an acoustic signal that includes a description of a dialogue contribution from a speaker, means for identifying the description and at least one parameter of the description using a dialogue move script (DMS), wherein the DMS corresponds to at least one of a device and an application, and means for mapping the description to a dialogue move using the DMS, the dialogue move corresponding to the identified parameter and independent of the device and application.

The RNDS of an embodiment comprises computer-readable medium including executable instructions, which when executed in a processing system, manage dialogue by receiving an input pattern generated from an acoustic signal that includes a description of a dialogue contribution from a speaker, identifying the description and at least one parameter of the description using a dialogue move script (DMS), wherein the DMS corresponds to at least one of a device and an application, and mapping the description to a dialogue move using the DMS, the dialogue move corresponding to the identified parameter and independent of the device and application.

The RNDS of an embodiment includes a method comprising at least one of providing a plurality of generic dialogue scripts in a dialogue management system based on an information-state-update approach, wherein the dialogue scripts each include extensions to routines, wherein the extensions provide functionalities that are specific to at least one of domains, devices, and applications, receiving an input into the dialogue management system, the input including a description of a dialogue contribution, and mapping the received input to at least one of a plurality of core components using at least one of the generic dialogue scripts, wherein the core components include dialogue management components that are independent of at least one of domains, devices, and applications.

The generic dialogue scripts of an embodiment include dialogue move scripts (DMS) and noun phrase-resolution scripts (NPRS).

The method of an embodiment further comprises receiving additional ones of the generic dialogue scripts, wherein the additional ones extend at least one of the domains, device, and applications that interact with the dialogue management system. The additional ones of an embodiment are received from at least one of new devices and new applications that couple to the dialogue management system.

Confidence Scoring for Confirmation

Figure 9:
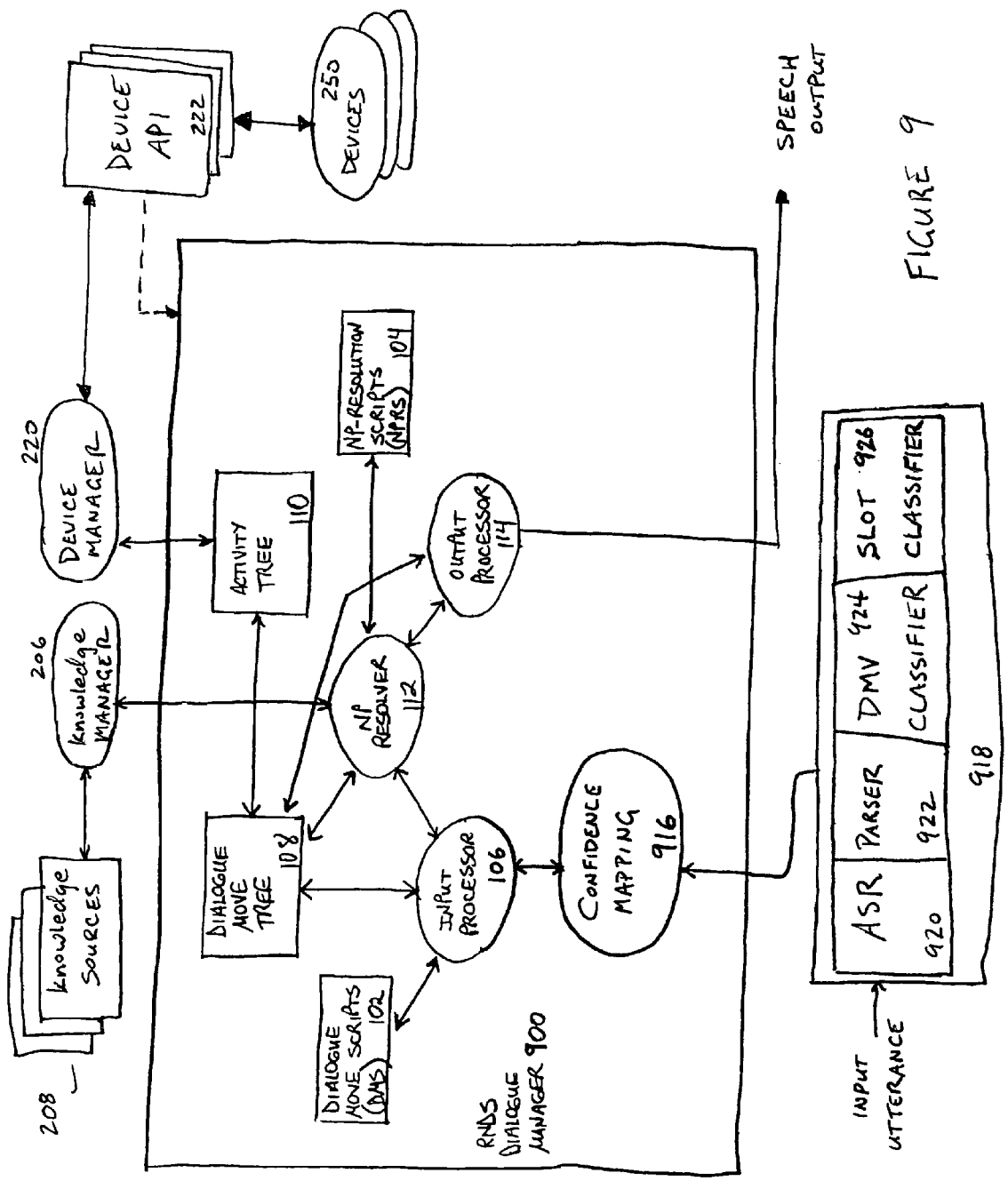
FIG. 9 illustrates an RNDS system in which the RNDS DM includes a confidence mapping module.

In one embodiment, the RNDS includes a confidence score mechanism that quantifies the probability that the speech recognition is correct and allows the DM to ask a confirmation question to the user, if necessary, prior to performing a dialogue move operation or action on a specified device. FIG. 9 illustrates an RNDS system under an embodiment, in which RNDS DM 900 includes a confidence mapping module 916.

the corresponding functionality correctly recognizes or can correctly process the input utterance. For example, the ASR 920 can generate a confidence score that corresponds to the probability that the input utterance was correctly recognized. Thus, the confidence score may be a confidence score generated by input unit 918 as a whole, or it may be a confidence score generated by one or more of the components 920, 922 and 924 individually or together. The confidence score may be a binary value of 0 or 1, where "0" represents no confidence that the input speech was correctly recognized and "1" represents 100 percent confidence that the input speech was correctly recognized. Alternatively, the confidence score may be a numerical value based on a predefined scale such as 0-10, 0-100, or O-N, where intermediate values between 0 and N provide a percentage measure of the confidence, e.g., a score of N/2 (5 on a 0-10 scale) represents a 50 percent confidence that the input speech was correctly recognized.

The confidence mapping module 916 maps (or translates) the numerical confidence score generated by the input unit 918 into a qualitative label. In one embodiment, the qualitative labels consist of "high," "medium," and "low." In this case, a high confidence could correspond to a confidence score of 10, a medium confidence could correspond to a confidence score of 5 and a low confidence could correspond to a confidence score of 0 (assuming a 0-10) scale. Other, more granular qualitative labels can also be used, such as "very high," "high medium," "low medium," "very low," and so on.

For the embodiment illustrated in FIG. 9, the grammar string input to the input processor 106 is enhanced (or annotated) with labels that incorporate the recognizer confidence in the features part of the ASR/Parser/DMC 918 output. An example of the enhanced syntactic label incorporating a qualitative confidence label is:

---

SYN{(features(mood(imperative),confidence(high)),predicate(#play),arglist(obj:playable-object)}

---

The confidence mapping module 916 may be a module included within the input processor 106 or other component within RNDS DM 900, or it may be a separate module or software component functionally coupled to one or more components within RNDS DM 900, as shown in FIG. 9.

The confidence mapping module 916 takes input from an input unit 918. In one embodiment, input unit 918 includes three components, an automatic speech recognizer (ASR) 920, a parser 922, and a dialogue move (DMV) classifier 924. Other processing components, such as slot classifier 926 may also be included within input unit 918. The input unit 918 may also be referred to as the ASR/parser/DMC 918. Each of components 920, 922, 924, and 926 may be separate functional modules that are implemented and operate independently of one another, or they may be partially or wholly combined into a single functional unit. For example, the ASR 920 and parser 922 components may be combined into a single ASR/Parser unit that is coupled to, but functionally independent of DMV classifier 924 and slot classifier 926. Any of the ASR/Parser components of input unit 918 may correspond in part to the NLU 202 and SR 204 components shown in FIG. 2, or they may be different components that perform the functions of speech recognition and parsing of the input utterance.

In one embodiment, the components within input unit 918 provide a confidence score that quantifies the probability that For the above example pattern "SYN" patterns match the output of a statistical parser of the ASR 920. The incorporation of a confidence level allows the DM 900 to match an input sentence that specifies a particular confidence level. For example, the string above would cause the system to match the input system "play X" with a high recognizer confidence. This enables the system to make or match different dialogue moves in DMT 108 based on the confidence level provided by the ASR/Parser/DMC 918.

The confidence mapping module 916 also allows the RNDS DM to formulate and provide a confirmation question in response to an input utterance depending upon the confidence score of the ASR 920, or any other component in input unit 918. For this embodiment, a keyword such as "confirm" is defined in the dialog move script 102. Thus, the input processor 106 may contain an input section that contains the following structure:

---

Input{
SYN{ ""'s(features(mood(imperative), confidence(high)),
predicate(#play), ?arglist(obj: _playable-object, ?sbj:*)) }
Confirm SYN{ ""'s(features(mood(imperative), confidence (medium)),
predicate(#play), ?arglist(obj: _playable-object, ?sbj:*)) }
}

If a pattern with the confirm keyword matches, a confirmation question will be asked before the dialogue move in DMT 108 is further processed. The DMS 102 thus compares the pattern to the input phrase and determines the dialogue move to be executed by the DMT 108. The DMS also marks a flag for the move to be confirmed or, alternatively, the action to be taken without confirmation.

If the confidence is low, either there is no match from that move and the system returns a general "did-not-understand" type response to the user through another move that has a broader pattern. Alternatively, to avoid a general response, a pattern can be generated for a low confidence score that is specific to the unmatched move. In one embodiment, a help function can be added through a structure such as:

```
HelpOn SYN{ ""s(features(mood(imperative), confidence(low)),
  predicate(#play), ?arglist(obj: _playable-object, ?sbj:*)) }
```

This help feature produces a node specific help message or hint for the user like "if you want to play something, try saying something like: 'play a Beatles song'". If the confidence is low, it can be assumed that the user's utterance was misrecognized by the speech recognizer. This can be due to a sub-optimal language model, i.e., one that has a zero or low probability for the utterance being recognized. In this case it can help to give the user a specific hint how to rephrase his request rather than provide a general response to the user.

These keyword facilities including the confidence( ) and confirm capabilities provide the ability of the system to change behavior on a pattern level. If it is unclear semantically, rather than in terms of confidence, whether a certain action is meant by the user input, the system can ask for confirmation even if the recognizer confidence is high. This enables the following dialog:
User: "a song by Cher"
System: "Do you want to play a song by Cher."
User: "yes"
System: "playing the song Believe"
It could also be used to require a confirmation from the user for actions like deleting a song or performing some other drastic action, even if the confidence is high.

In general, it has been found that many errors of the speech recognizer happen in the noun phrase part of an utterance. For example, the phrase "play believe by Cher" can get recognized as "play bell leaving blur." Quite often, the misrecognized noun phrase (here: "believe blur") does not make sense and a resolution does not exist. Since the patterns usually match any noun phrase, no error is detected in the dialog move determination step, but is instead detected at a later time, such as when the system tries to resolve the noun phrase. In one embodiment, the dialog manager 900 is configured to resolve the noun phrase before asking a confirmation question. If the noun phrase cannot be resolved, the system returns the response "I don't have . . . " without asking for confirmation. An alternative answer would be "I'm not sure if you meant that, but I don't have . . . "

This configuration of the dialogue manager prevents the following dialog that may result from a confirmation strategy and the fact that misrecognitions are likely to come with a lower confidence:
User: "play believe by Cher" (recognized as "play bell leaving blur" with medium confidence)
System: "Do you want to play bell leaving blur?"
This response is not very intelligent and may frustrate the user. With the dialogue manager configured to resolve the noun phrase prior to the asking of a confirmation question, the noun phrase is resolved before an unintelligible confirmation question is asked. It could also happen that the recognition was correct, but the object (e.g., song) is not available. This is exemplified by the following dialogue:
User: "play believe by Cher"
System: "Do you want to play believe by Cher?"
User: "sure"
System: "I don't have believe by Cher."
Although the noun phrase was correctly resolved, the response is still frustrating, and if fact could be even more frustrating than the previous exchange. In this case, having the dialogue manager configured to return a response such as "I don't have . . . " or "I'm not sure if you meant that, but I don't have . . . " without providing confirmation would provide a more satisfactory response to the user.

Figure 10:
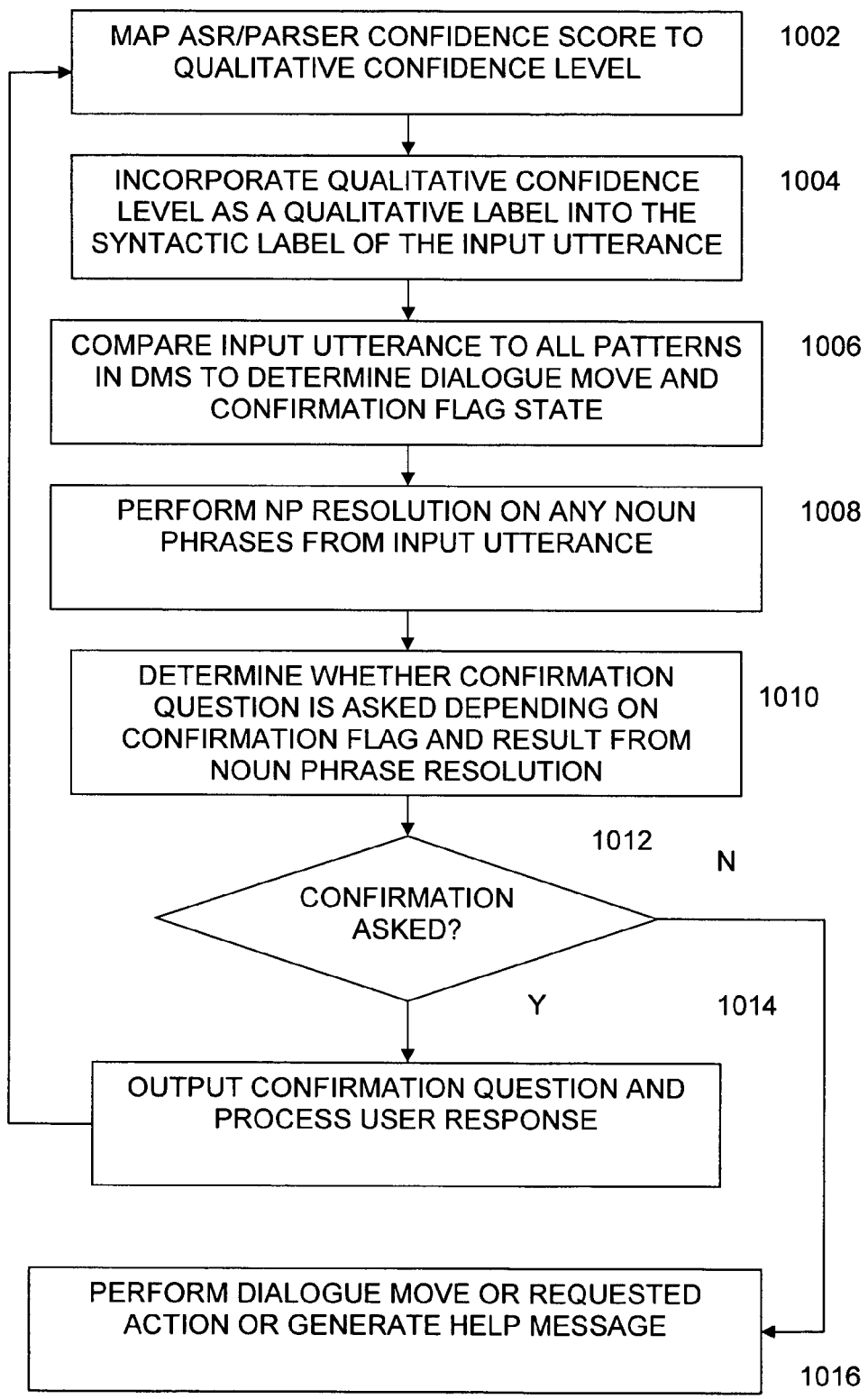
FIG. 10 is a flowchart that illustrates a method of formulating a confirmation question based on a confidence score, according to an embodiment.

FIG. 10 is a flowchart that illustrates a method of formulating a confirmation question based on a confidence score provided by a speech recognizer module 920 or a combined input module such as ASR/Parser/DMC 918, according to an embodiment. As stated above, the ASR/parser/DMC module 918 typically provides a numerical confidence score. For example, ASR 920 may provide a numerical confidence score rated on a 0-10 scale. The confidence mapping module 916 maps (or converts) this numerical confidence score into a qualitative confidence level (e.g., high, medium, low) 1002. This qualitative confidence level is incorporated as a qualitative label into the syntactic label of the input utterance, 1004. The DM system compares the input utterance to all patterns in the dialogue move tree to determine the dialogue move, 1006. A confirmation flag state is also determined at this stage. The confirmation flag may be a binary flag, i.e., either ask a specific confirmation question or not, or it may be a flag that can be decoded to determine a particular confirmation question to ask, if a confirmation question is to be asked.

The system then performs any NP resolution on the noun phrases in the input utterance, 1008. In 1010, it is determined whether a confirmation question is to be asked depending on the state of the confirmation flag and the result state from the noun phrase resolution. If, in 1012 it is determined that no confirmation question is to be asked, the system performs the dialogue move, 1016. In the case where the processing cannot formulate a confirmation question or perform a dialog move, a help message may be generated to prompt the user to provide a different input. If, in 1012 it is determined that a confirmation question is to be asked, the system generates the confirmation question and processes the user response back through the system, 1014.

Confidence Scoring for Multi-Device Dialogue

In one embodiment, the RNDS DM 900 is configured to enhance single or multi-device dialogue by evaluating and selecting amongst candidate moves based on features at multiple levels. Multiple sources of information are combined and multiple devices and dialog moves considered to determine the highest scoring interpretation hypothesis overall. For this embodiment, it is assumed that the various sources of information can include a speech recognizer unit and parser (such as shown as element 920 and 922 in FIG. 9), one or more dialogue-enabled devices (such as shown as element 250 in FIG. 9), elements of the dialogue manager 900 itself that provide contextual features for the input dialog, external application-specific components such as ontologies or knowledge bases, as well as any other component of the RNDS DM 900 that may be used to help determine the proper interpretation of the input utterance. Each source of information provides a confidence score or confidence measure that indicates the confidence of proper interpretation associated with that particular source.

In one embodiment, all devices or sources in the system perform shallow processing of the incoming utterance and each produces multiple possible candidate dialogue moves. (See, e.g., Smith, R. G., 1980, "The Contract Net Protocol: High Level Communication and Control in a Distributed Problem Solver", IEEE Transactions on Computers: C-29 (12):1104-1113). Potential device-move combinations are then scored against a number of features, including speech-recognition and parser confidence, discourse context, current device-under-discussion, and noun-phrase argument analysis. The device associated with the highest-scoring dialogue move is given first option to process the utterance. A disambiguation question may be generated if no device is a clear winner, or a confirmation question may be generated if the winning bid is not scored high enough. In this system, device choice, move choice, and selection of best ASR/parser hypothesis are thereby made simultaneously, rather than being treated as independent processes. This allows for principled device identification, as well as provides the advantage of scoring hypotheses on the basis of multiple information sources, including context. In some cases, the highest scoring result overall may not correspond to the highest-confidence result from the speech recognizer or parser n-best list alone, but n-best lists are effectively re-ordered based on device and dialogue context, allowing parsing errors such as incorrect PP-attachment to be automatically corrected. Confirmation and clarification behaviour can also be governed not only by speech recognizer or parser confidence, but by the overall confidence score.

For the embodiment illustrated in FIG. 9, in which the RNDS system has been configured to accommodate multi-device dialog with the above-described scripting methodology, each of the devices 250 is a "dialogue-enabled" device. Interaction is mediated between the user and the system by a single dialogue manager 900 with which the devices register themselves. As dialogue-enabled devices, each device of devices 250 has associated with it a set of dialogue-move scripts; an activity model describing any device functionality accessible by dialogue; a device-specific ontology and knowledge-base; and rules for device-specific noun phrase resolution. As devices are added to the system, they register themselves or are registered with the device manager 220 and become associated with their own nodes to which new conversation threads can attach. A "current device" parameter becomes part of the information-state and interpreting incoming utterances is performed in this context. Thus, device selection, i.e., determining which device an utterance is associated with is resolved by the RNDS DM 900 in those cases where an utterance may be potentially applicable to multiple devices. For example, the command "play [a track]" could be applicable to either an MP3 player or a DVD player. As opposed to simple device-disambiguation techniques and single interpretation mechanisms, the RNDS DM 900 uses multiple information sources in parallel to classify a dialogue move type and produce an activity-specific representation. Arbitrary multiple interpretation mechanisms, each producing their own independent interpretation hypothesis and confidence measure are used, along with a statistical parser producing relatively deep dependency structures and a shallow topic classifier.

Under an embodiment, dialogue move scripts are used to construct instantiations of candidate dialogue moves for a device, based on incoming user utterances (and planned system outputs. FIG. 11 illustrates an example of a dialogue move script for constructing instantiations of a candidate dialogue move for a device of a plurality of devices, according to an embodiment. The dialogue move script is governed by the Input Field for each move type, which specifies a set of patterns. When an utterance representation matches an Input Pattern, a candidate node of the appropriate type can be created. As the listing of FIG. 11 shows, patterns can be defined in terms of interpretation method as well as the interpreted form itself. For the example shown, SYN patterns match the output of the statistical parser, TOPIC patterns match the output of the topic classifier, while AND patterns match combinations of the two. Further general pattern types are available, e.g., LF for semantic logical forms, STRING for surface string keyword-matching.

Each pattern is associated with a weight, used in the overall move scoring function described below. This allows moves created from matches against deep structure to be scored highly (e.g. SYN patterns in which predicate and arguments are specified and matched against), shallow matches to be scored low (e.g. simple TOPIC matches), and combined matches to have intermediate scores (e.g. a combination of an appropriate TOPIC classification with a SYN parser output containing a suitable NP argument pattern). Depending on other elements of the scoring function (e.g., the speech recognizer confidence associated with the hypothesized string being tested) and on competing move hypotheses, low scores may lead to clarification being required, and therefore clarification will be more likely when only low-scoring (shallow) patterns are matched. Behaviour can therefore be made more robust: when deep parsing fails, a shallow hypothesis can be used instead (clarifying/confirming this specific hypothesis as necessary depending on its confidence) rather than resorting to a rejection or general clarification. Scores can be set manually and determined by testing on sample dialogues, or they can be learned from past data.

In one embodiment, multiple possible candidate dialogue moves will be produced for a given input utterance based on the following factors: multiple hypotheses from a speech recognizer and/or parser (e.g., ASR/parser/DMC 918) output; multiple interpretation methods (deep parsing vs. shallow classification); multiple possible move types for a candidate interpretation; and multiple antecedent nodes (active dialogue threads), including multiple devices, for a particular move type. In general, these factors are not independent, and all are considered simultaneously to allow an integrated scoring function for each candidate and for the best overall score to be determined and considered.

FIG. 12 is a program code excerpt illustrates an algorithm executed by the RNDS DM 900 to instantiate and select a dialogue move based on these multiple factors. For the scoring function illustrated in FIG. 12, dialogue-move candidates are scored using a number of weighted features, ranging from speech-recognizer confidence, to pragmatic features such as the "device in focus" and age of the DMT node the candidate would attach to. FIG. 13 is a table that lists the features used for the scoring function, according to an embodiment. As shown in FIG. 13, the features include recognition features, semantic features, and general features. In general, the features are included at many levels of processing, from acoustic recognition confidences through syntactic parse confidences to semantic and pragmatic features. For the one or more dialogue-enabled devices 250 that may be coupled to RNDS DM 900, each device may provide confidence scores for one or more of the features shown in FIG. 13.

In one embodiment, the integrated scoring mechanism based on multiple sources allows n-best list input to be re-ordered. Dialogue move candidates are potentially instantiated for each n-best entry and the highest-scoring candidate chosen. While the n-best list rank and confidences are factors in the overall score, other features may outweigh them, resulting in an initially lower-ranked n-best entry becoming the highest-scoring dialogue move.

The scoring function for feature combination may be manually defined. In this case, comparing between candidate moves of the same type may be relatively straightforward but non-trivial and inherently done to a high extent by subjective expertise. This process becomes less straightforward when comparing candidates of different types, since some move types and some DMT attachment contexts may allow only a subset of the features to have meaningful values. However, comparisons between move types is essential, as two speech recognizer hypotheses with similar recognition scores may have very different possible move types.

Alternatively, the scoring function may implement the use of machine learning techniques to improve current manual definitions. With annotated data the optimal weights of a scoring function that combines all the features can be automatically learned, under this alternative embodiment.

In one embodiment, threshold values are specified as part of dialogue-move definitions to determine the dialogue move that is to be executed. The threshold values may be pre-defined or they may be automatically learned. In order for a potential move to be unambiguously accepted, its score must be above the next highest score by more than a predefined threshold "T1". If the highest scoring potential move is not above this threshold, this score is taken to be within a pre-defined margin of error, and the dialogue manager can ask a disambiguating clarification question. Alternatively, in some cases, the highest scoring move will be of low absolute confidence. In such cases, rather than act on the move unconditionally the user is asked for clarification. If the score is below this certain confidence threshold, the highest scored move is treated as a reasonable hypothesis, but the user is asked for confirmation of the intended move. If the score is below a second critical minimum threshold "T2," the move is taken as a failure in interpretation, and the user is asked for a general clarification question since, in this case, the hypothesized move is likely to be incorrect and asking for specific confirmation is likely to be counter-productive or annoying.

Figure 14:
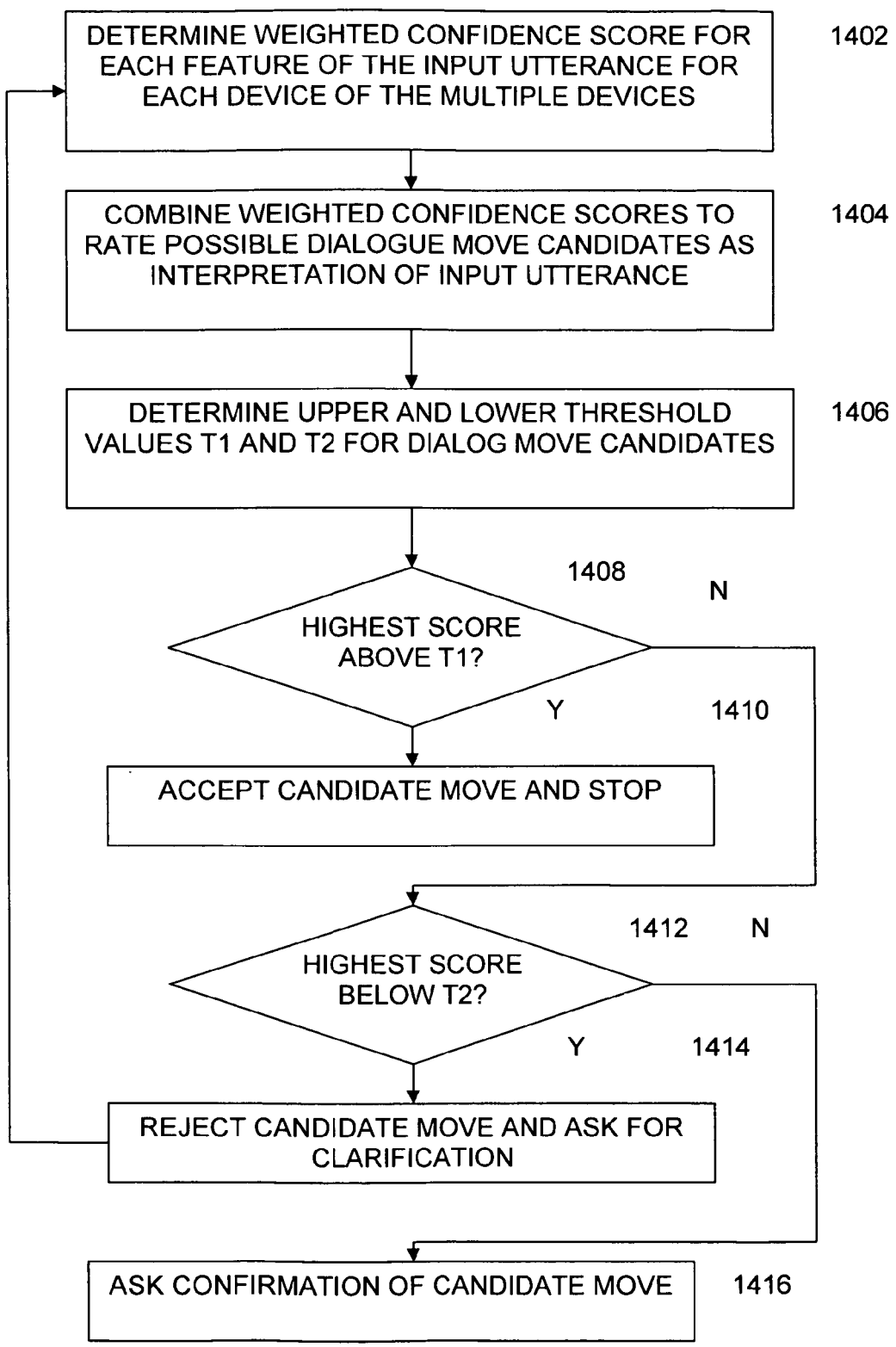
FIG. 14 is a flowchart that outlines the determination of a dialogue move in a multi-device environment, according to an embodiment.

Under the multiple device embodiment of the RNDS DM 900 illustrated in FIG. 9, features from multiple sources of evidence regarding the speech recognition are combined to rate the possible dialogue move candidates as interpretations of an input utterance. FIG. 14 is a flowchart that outlines the determination of a dialogue move in a multi-device environment, according to an embodiment. In 1402, the weighted confidence score for each feature of the input utterance is determined, and this is repeated for each device of the multiple devices, if there are multiple devices in the system. Features include confidence scores from ASR and parser, as well as semantic and pragmatic criteria, and measures related to the dialogue context itself. The weighted confidence scores are then combined to rate the possible dialogue move candidates as the interpretation of the input utterance, 1404. Based on the highest confidence score, the optimum dialogue move is selected, and in a multi-device setting, the appropriate device being addressed is selected from a number of possible devices.

Confidence thresholds (upper and lower bounds) set by the dialogue designer specify the levels at which a candidate move is rejected, requires explicit confirmation by the user, or is accepted. In 1406, the upper and lower threshold values (T1 and T2) are determined. The optimal values for the thresholds and optimal weights on the features for scoring candidate dialogue-moves can be pre-defined or automatically learned. In 1408 it is determined whether the highest candidate move score is above the high threshold, T1. If it is, then the move candidate move can simply be accepted, the system then processes the dialogue move and stops, or processes another input utterance, 1410. If the highest score is not above T1, there is no clear winning move, and the system determines if the highest score is below the lower threshold T2, 1412. If the highest score is below T2, then the candidate move or moves are taken as a failure of interpretation, and the user is asked for clarification, 1414, and the system then processes the user's answer to the clarification question. If the highest score is between T1 and T2, as determined in 1408 and 1412, the highest score is treated as a reasonable hypothesis and the user is asked for confirmation of the intended move, 1416.

In one embodiment, the threshold values T1 and T2 define three possible confidence ranges that can be used by confidence mapping module 916 to determine the confirmation or clarification question to be asked of the user and/or the action to be taken with regard to the dialogue move, as described in the section above. Thus, if the highest scoring candidate move has a combined weighted score above T1, this may correspond to a "high" confidence, and if the highest scoring candidate move has a combined weighted score below T2, this may correspond to a "low" confidence, with any score in between corresponding to a "medium" confidence.

Dialogue Move Classification

In one embodiment of the present invention, the ASR/Parser/DMC module 918 shown in FIG. 9 includes a dialogue move (DMV) classifier function that utilizes a Conditional Maximum Entropy (CME) method to model the data representing the input utterance. The dialogue move classifier module 924 may be an independent module within input component 918 or it may be combined with either one or both of the ASR 920 and parser 922 functions within 918. Alternatively, the dialogue move classifier functions may be implemented as a functional block within RNDS DM 900, such as a process within or coupled to input processor 106.

The DMV classifier module 924 generally takes input from the ASR 920 in the form of text input that is converted from the spoken input utterance. Alternatively, the text input could be taken from a parser. The dialogue move classifier 924 derives features from the input text and derives features from the input utterance. In so doing, it essentially replaces specific references within the input speech into more general categories, thus improving the chances of finding an appropriate dialogue move operation for the input utterance. The DMV classifier 924 first performs a pre-processing step in which all proper names within the input utterance are replaced with name type. This replacement step can be done manually by the user or automatically by the system. In this pre-processing operation, a name for a particular type of object is changed into a generic OBJECTNAME type. Thus, if the input includes the name of a restaurant, the pre-processing step would replace the actual restaurant name with a RESTAURANTNAME string. Continuing with an example using a restaurant search request input into the system, the following type replacements could be made:

a. Change restaurant name into RESTAURANTNAME
b. Change cuisine type name into CUISINETYPE
c. Change street name into STREETNAME
d. Change city name into CITYNAME
e. Change parameters into generic types: OPENHOURS, SPECIALCON, RATING, DRESSLEVEL, PRICELEVEL, CCARDNAME, etc . . .

Once the input utterance has been pre-processed with all actual names replaced by name types, the DMV classifier 924 labels every sentence into one of twelve classes. FIG. 17 is a table that lists the possible classes for the DM classifier, under an embodiment. It should be noted that the classes listed in FIG. 17 represent examples of possible classes, and that classes other than those illustrated can also be specified. Once every sentence has been classified, the DMV classifier 924 generates a sentence-label pair. In one embodiment, a CME process is applied to the sentence-label pair to model the data. The classifier can incorporate one or more features to characterize or further condition the sentence label pair. In an embodiment, the classification algorithm uses two types of features based on keyword position. For words that do not have position information associated therewith, matches may be made based on whether the word simply exists in the sentence. For words that do have position information associated therewith, matches can be made based on the presence of the word and its position in a particular place in the sentence. For example, if the input phrase is "Can I go . . . " The presence of the word "can" at the beginning would cause the sentence to be labeled as an inquiry (whquery); whereas in "I can go . . . " will be labeled differently due to the position of "can."

Figure 15:
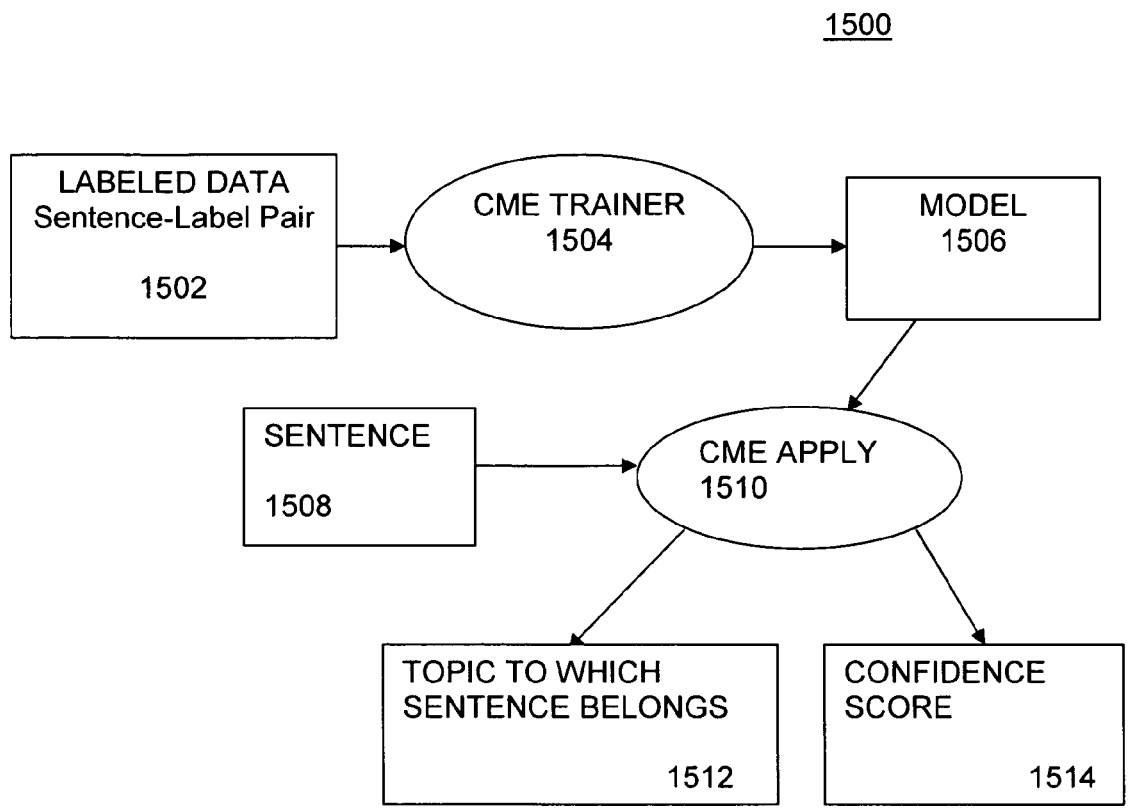
FIG. 15 is a flow diagram of dialogue move classification method, under an embodiment.

FIG. 15 is a flow diagram of dialog move classification method, under an embodiment. In system 1500, the labeled data 1502 consists of each sentence-label pair generated by the pre-processing and labeling stages of the DMV classifier 924. The sentence-label pairs comprise the input sentences with the proper names replaced with TYPE information, and the sentence class. The labeled data 1502 is then input to a CME trainer module 1504 that derives a model 1506 based on a weighted list of features. These maximize certain criteria based on CME methods and constraints derived from the input data. Once the model 1506 is derived, it is applied to any new or related sentences 1508 by CME apply process 1510. After the CME method is applied to the sentence, the DM classifier outputs the topic to which the sentence belongs, 1512. The topic may be a label or metric that lists the n-best topics.

In one embodiment, the DMV classifier 924 also determines and generates a confidence score 1514 relating to a probability that the input sentence is related to the topic. In one embodiment, the confidence score is a numerical value on pre-defined scales, such as 0-1 or 0-10, and so on. The probability determined by the system can be based on past knowledge utilized by the system, or by a training method, such as CME. For the embodiment of the RNDS DM 900 shown in FIG. 9, the confidence score generated by the DMV classifier 924 can be input to the confidence mapping process 916 and processed in the same manner described above. Thus, the numerical confidence score generated by the DM classifier is transformed into a qualitative label (e.g., high, medium, low) and incorporated into the syntactic label text string input to input processor 106. If the DMV classifier 924 is implemented as part of an input component also containing one or both of ASR 920 and 922, each of which may also generate confidence scores, the confidence score from the DMV classifier 924 may be combined with these other confidence scores, or substitute for (or be substituted by) one or more of these other confidence scores.

Figure 16:
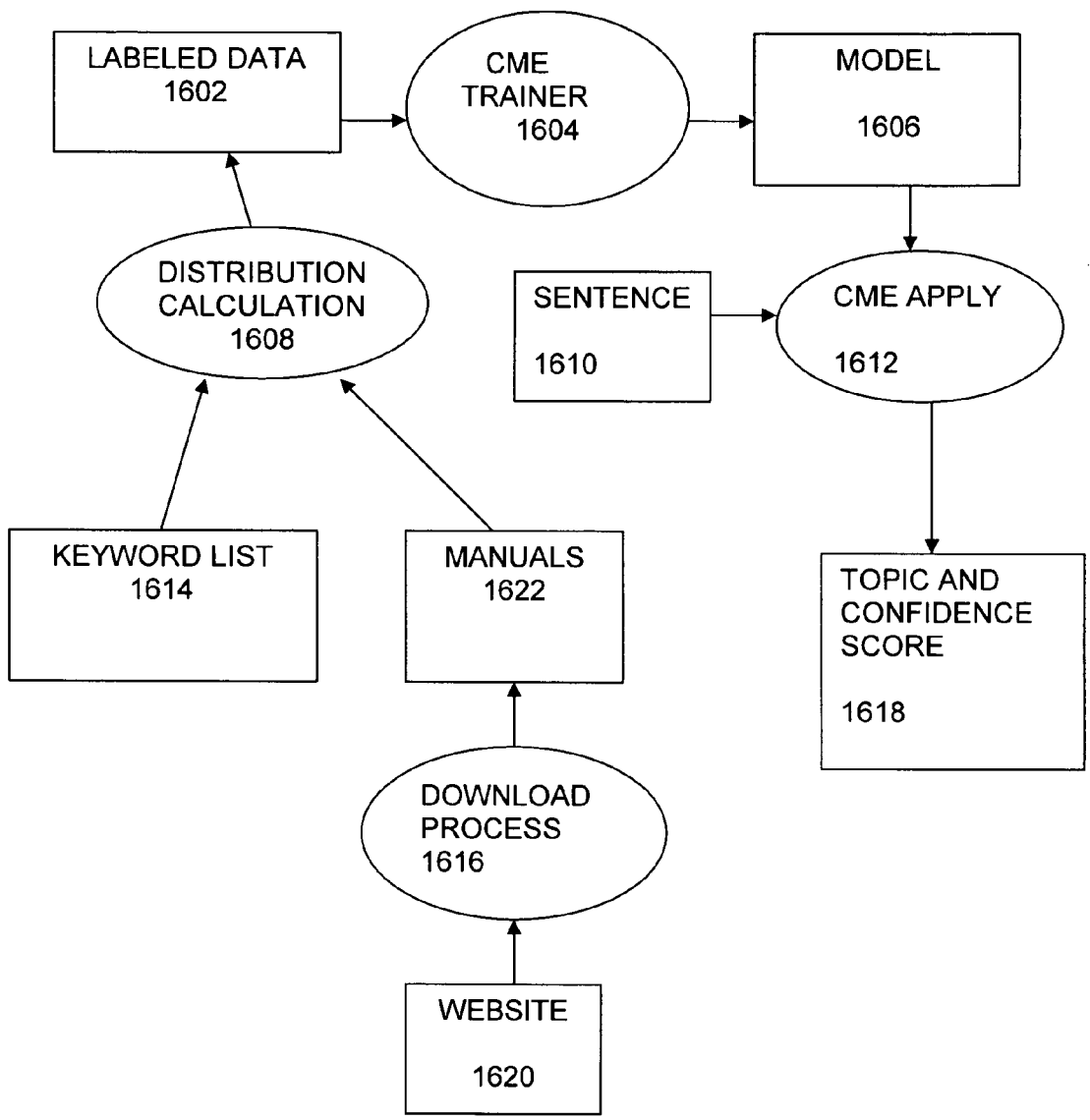
FIG. 16 is a flow diagram of a dialogue move classification method with keyword extraction (slot classification), under an embodiment.

The DMV classifier 924 illustrated in FIG. 9 is basically configured to operate on full sentences. Alternatively, classification and CME modeling can be performed on keywords, rather than full sentences. In one embodiment, the slot classifier 926 component shown in FIG. 9 implements a keyword download and extraction process can also be implemented at the input stage of the dialog process to facilitate keyword entry and pre-processing. FIG. 16 is a flow diagram of a slot classification method with keyword extraction, under an embodiment. As used herein, a "slot" is a parameter or similar characteristic related to the input speech, and corresponds to or is associated with a keyword found in the input. For example, location or cuisine type can be a slot for a query involving a restaurant search.

In system 1600 of FIG. 16, a keyword list 1614 is input into a distribution calculation process 1608. The words in the list represent keywords that are to be processed. Certain features concerning the keywords can also be input into the system to further determine the dialogue move to be executed based on the keyword. For example, the frequency with which a keyword appears in particular usage, such as in a catalog (e.g., menu or songlist) can be used in the classification process. For the embodiment illustrated in FIG. 16, the catalog is provided by an online source, website 1620, and downloaded into the distribution calculation stage through a download process 1616. In one embodiment, the download process produces one or more manuals 1622 that represent a collection of data (typically text-based).

The distribution calculation process 1608 determines the number of times (frequency) which a particular keyword appears in the catalog. The keyword and distribution information is then provided as labeled data 1602 to CME trainer process 1604. The labeled data 1602 comprises the keyword-label pair as well as the frequency metric. The labeled data 1602 is then input to a CME trainer module 1604 that derives a model 1606 based on a weighted list of features. In this case, the frequency feature is already provided by the labeled data process, and word position is not used as a feature. Once the model 1606 is derived, it is applied to any new or related sentences 1610 by CME apply process 1612. After the CME method is applied to the sentence, the slot classifier 926 outputs the topic to which the keyword belongs, 1618. The topic may be a label or metric that lists the n-best topics. For the embodiment shown in FIG. 16, the slot classifier 926 also determines and generates a confidence score relating to a probability that the keyword in the input sentence is related to the topic.

The sentence and keyword based systems illustrated in FIGS. 15 and 16 have many possible applications in areas such as restaurant or music searching. For example, in the restaurant application, the catalog provided to the system may comprise a menu downloaded from a restaurant's website. The keywords extracted from the system could comprise a certain ingredient or type of cuisine. Using the keyword classification and frequency feature, the system could return a suitable restaurant serving dishes featuring a particular ingredient in response to a search by a user requesting a particular type of food. Many other possible applications involving keyword processing can also be implemented using the embodiments described herein. In general, the confidence scoring mechanisms allow the dialog management system to perform dialog moves in response to the noun-phrase resolution process, as well as the associated confidence attached to the probability that the input utterance can be properly processed.

Aspects of the RNDS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the RNDS include: microcontrollers with memory (such as electronically erasable programmable read only memory (EEPROM)), embedded microprocessors, firmware, software, etc. Furthermore, aspects of the RNDS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described and expressed (or represented) as data and/or instructions embodied in various computer-readable media. Computer-readable media in which such data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the RNDS is not intended to be exhaustive or to limit the RNDS to the precise form disclosed. While specific embodiments of, and examples for, the RNDS are described herein for illustrative purposes, various equivalent modifications are possible within the scope of the RNDS, as those skilled in the relevant art will recognize. The teachings of the RNDS provided herein can be applied to other processing systems and methods, not only for the systems and methods described above.

The elements and acts of the various embodiments described above can be combined to provide further embodiments. These and other changes can be made to the RNDS in light of the above detailed description.

In general, in the following claims, the terms used should not be construed to limit the RNDS to the specific embodiments disclosed in the specification and the claims, but should be construed to include all processing systems that operate under the claims. Accordingly, the RNDS is not limited by the disclosure, but instead the scope of the RNDS is to be determined entirely by the claims.

While certain aspects of the RNDS are presented below in certain claim forms, the inventors contemplate the various aspects of the RNDS in any number of claim forms. For example, while only one aspect of the RNDS is recited as embodied in machine-readable medium, other aspects may likewise be embodied in machine-readable medium. Accordingly, the inventors reserve the right to add additional claims after filing the application to pursue such additional claim forms for other aspects of the RNDS.

What is claimed is:

1. A method of determining a dialogue move in a multi-device environment, comprising:

receiving an input utterance from a speaker through an input component, the input utterance directed to a plurality of devices in the multi-device environment, wherein each device of the plurality of devices is associated with a respective activity model encapsulating device-specific information for the respective device;

generating an input pattern from the input utterance that includes a structured description of a dialogue contribution by the speaker, the structured description including one of syntactic, semantic and phonological information;

performing shallow processing of the input utterance through an activity tree functionally coupled to the activity model for each device of the plurality of devices to produce a plurality of candidate dialogue moves, wherein the activity tree manages activities of the devices relevant to the input utterance;

identifying the description and at least one parameter of the description using a dialogue move script (DMS), wherein the DMS is used in identifying the description and at least one parameter of the description and corresponds to at least one device of the plurality of devices, and wherein the dialogue move is independent of the device;

mapping the description to a dialogue move of the candidate dialogue moves using the DMS, the dialogue move corresponding to the identified parameter;

receiving a confidence score from a speech recognizer component coupled to the input component, the confidence score quantifying the probability that the speech recognizer component can recognize the input utterance, and to produce an n-best list of dialogue moves;

translating the confidence score into a qualitative description of the likelihood of proper recognition;

incorporating into the dialogue move script a keyword allowing the formulation by a dialog manager component of a confirmation question in response to the input utterance; and formulating one of a confirmation question if the confidence score is above a defined threshold value or a help message if the confidence score is equal to or below the defined threshold value;

combining weighted confidence scores for the plurality of devices into a combined confidence score to select an appropriate device of the plurality of devices and re-ordering the n-best list based on the combined confidence score to rate one or more of the dialogue move candidates as the interpretation of the utterance.

2. The method of claim 1, wherein the input component comprises one of a speech recognizer process, a parser, and a dialogue move classifier process.

3. The method of claim 2 further comprising:
identifying proper names within the input pattern;
replacing identified proper names with associated type classifications;
labeling the input pattern with a classification denoting a class of a plurality of classes;
modeling the input pattern using a conditional maximum entropy method to characterize the input pattern as a class and a feature; and
determining a topic defined within a dialogue move script to which the input pattern corresponds.

4. The method of claim 1 further comprising registering each device of the plurality of devices with a device manager associated with the input component to become associated with respective nodes to which new conversation threads can attach.

5. The method of claim 1 wherein the activity model for each device comprises a declarative specification of the device and includes mappings from a predicate/argument structure to device actions.

6. The method of claim 1 wherein the keyword comprises a label and the qualitative description of the likelihood of proper recognition, the method further comprising:
determining whether a pattern of the input utterance matches the keyword; and
formulating the confirmation question if the input utterance matches the keyword prior to processing in a dialog move tree that is functionally coupled to the activity tree and utilizes the activity model.

7. The method of claim 6 further comprising marking a flag in the DMS indicating that the dialog move is to be confirmed or that an action is to be taken in a device relevant to the input utterance without confirmation.

8. The method of claim 1 wherein the help message comprises a one of: a hint suggesting a possible recognizable input utterance, and a request for the user to rephrase the input utterance.

9. A method of determining a dialogue move in a multi-device environment, comprising:
receiving an input utterance from a speaker through an input component, the input utterance directed to a plurality of devices in the multi-device environment, wherein each device of the plurality of devices is associated with a respective activity model encapsulating device-specific information for the respective device;
generating an input pattern from the input utterance that includes a structured description of a dialogue contribution by the speaker, the structured description including one of syntactic, semantic and phonological information;
performing shallow processing of the input utterance through an activity tree functionally coupled to the activity model for each device of the plurality of devices to produce a plurality of candidate dialogue moves, wherein the activity tree manages activities of the devices relevant to the input utterance;
identifying the description and at least one parameter of the description using a dialogue move script (DMS), wherein the DMS is used in identifying the description and at least one parameter of the description and corresponds to at least one device of the plurality of devices, and wherein the dialogue move is independent of the device and application;
mapping the description to a dialogue move of the candidate dialogue moves using the DMS, the dialogue move corresponding to the identified parameter;
receiving a confidence score from a speech recognizer component coupled to the input component, the confidence score quantifying the probability that the speech recognizer component can recognize the input utterance, and to produce an n-best list of dialogue moves;
translating the confidence score into a qualitative description of the likelihood of proper recognition;
incorporating into the dialogue move script a keyword allowing the formulation by a dialog manager component of a confirmation question in response to the input utterance; and
formulating one of a confirmation question if the confidence score is above a defined threshold value or a help message if the confidence score is equal to or below the defined threshold value;
receiving a confidence score for each of a plurality of features of the input utterance for each device of the plurality of devices, wherein the confidence score comprises a numerical value representing a probability of proper recognition of the input utterance, and wherein the features are selected from the group consisting of: confidence scores from a speech recognizer component, confidence scores from a parser coupled to the speech recognizer, semantic criteria, pragmatic criteria, and dialogue context;
assigning a weight to each feature to generate a weighted confidence score for each device based on the shallow processing by each device;
combining the weighted confidence scores for the plurality of devices into a combined confidence score to select an appropriate device of the plurality of devices and re-ordering the n-best list of dialogue move candidates based on input context to rate one or more of the dialogue move candidates as the interpretation of the input utterance; and
processing the input utterance in the appropriate device to produce an output most appropriate to the input utterance.

10. The method of claim 9 further comprising:
mapping the combined confidence score to a qualitative confidence measure;
formulating a confirmation question to be sent to the speaker if no device of the plurality of devices has the highest weighted confidence score; and
transmitting the confirmation question to the speaker, wherein the dialogue move corresponds to the identified parameter and an answer to the confirmation question.

11. The method of claim 10, wherein the qualitative confidence measure comprises one of a low, medium and high syntactic value.

12. The method of claim 11, further comprising
defining a first confidence threshold to specify a level at which a highest scoring dialogue move candidate is accepted;

defining a second confidence threshold to specify a level at which the highest scoring dialogue move candidate is rejected; and rejecting the candidate move if the combined confidence score of the candidate dialogue move is below the second confidence threshold value.

13. The method of claim 12, further comprising accepting the candidate move if the combined confidence score of the candidate dialogue move is above the first confidence threshold value.

14. A system comprising:

a plurality of devices in a multi-device environment, each device of the plurality of devices having a respective activity model encapsulating device specific information for the device;

an input circuit of each device of the plurality of devices for receiving and syntactically labeling an input pattern generated from an input utterance by a user, the input component including one or more subunits configured to generate a confidence score representing a probability or proper recognition of the input utterance, the user utterance directed generally to the plurality of devices in the multi-device environment;

an input processor circuit of each device performing shallow processing of the input utterance through an activity tree functionally coupled to the activity model for each device to produce a plurality of candidate moves, wherein the activity tree manages activities of the devices relevant to the input utterance, the input processor further receiving a structured description of a dialogue contribution from the user within the input utterance, the structured description including one of syntactic, semantic and phonological information;

a dialogue manager coupled to the input component that includes a plurality of dialogue moves including the candidate moves, and a dialogue move script (DMS) that is used in identifying the description and at least one parameter of the description and corresponds to at least one device of the plurality of devices, the DMS mapping the description to a dialogue move of the candidate dialogue moves, wherein the dialogue move is independent of the device;

a speech recognizer component coupled to the input component and generating a confidence score quantifying the probability that the speech recognizer component can recognize the input utterance, and producing an n-best list of dialogue moves;

a confidence mapping circuit coupled to the dialogue manager and configured to receive a confidence score from the speech recognizer component, map the confidence score to a qualitative confidence measure, and incorporate into the dialogue move script a keyword allowing the formulation by a dialog manager component of a confirmation question in response to the input utterance and formulate one of a confirmation question if the confidence score is above a defined threshold value or a help message if the confidence score is equal to or below the defined threshold value, the confidence mapping circuit further combining weighted confidence scores for the plurality of devices into a combined confidence score to select an appropriate device of the plurality of devices and re-ordering the n-best list based on the combined confidence score to rate one or more of the dialogue move candidates as the interpretation of the utterance; and a selection circuit causing the input utterance to be processed in the device of the plurality of devices with the highest confidence score to produce an output most appropriate to the input utterance.

15. The system of claim 14 wherein the input processor circuit comprises at least one of an automatic speech recognizer and a parser.

16. The system of claim 15 each device of the of the plurality of devices is configured to generate a confidence score for each feature of the input utterance, the dialogue manager configured to assign a weight to each feature to generate a weighted confidence score for each device of the one or more devices, and combine the weighted confidence scores for the one or more devices into a combined confidence score.

17. The system of claim 16 wherein the features are selected from the group consisting of confidence scores from a speech recognizer component, confidence score from a parser, the combined confidence score, semantic criteria, pragmatic criteria, and dialogue context.

18. The system of claim 17, wherein the qualitative confidence measure comprises one of a low, medium and high syntactic value, the dialogue manager further configured to:

define a first confidence threshold corresponding to the high syntactic value to specify a level at which a highest scoring dialogue move candidate is accepted;

define a second confidence threshold corresponding to the low syntactic value to specify a level at which the highest scoring dialogue move candidate is rejected;

compare the input pattern to patterns in a dialogue move script to determine a possible dialogue move.

* * * * *